United States Patent
Brandmaier et al.

(10) Patent No.: US 10,839,460 B1
(45) Date of Patent: Nov. 17, 2020

(54) CONFIGURING AN APPLICATION TASK LIST OF AN APPLICATION BASED ON PREVIOUS SELECTIONS OF APPLICATION TASKS

(71) Applicant: Allstate Insurance Company, Northbrook, IL (US)

(72) Inventors: Jennifer A. Brandmaier, Chicago, IL (US); James Gillespie, Belfast (GB); Stephen Hughes, Belfast (GB); Daniel Koza, Hinsdale, IL (US); William Loo, Arlington Heights, IL (US); Francis Lowry, Clogher (GB)

(73) Assignee: Allstate Insurance Company, Northbrook, IL (US)

( * ) Notice: Subject to any disclaimer, the term of this patent is extended or adjusted under 35 U.S.C. 154(b) by 568 days.

(21) Appl. No.: 15/057,549

(22) Filed: Mar. 1, 2016

Related U.S. Application Data

(63) Continuation of application No. 13/791,308, filed on Mar. 8, 2013, now Pat. No. 9,280,252.

(51) Int. Cl.
*G06Q 40/08* (2012.01)
*H04M 1/725* (2006.01)
(Continued)

(52) U.S. Cl.
CPC ............ *G06Q 40/08* (2013.01); *G06F 3/0482* (2013.01); *G06F 3/04842* (2013.01); *H04M 1/72522* (2013.01); *H04W 4/08* (2013.01)

(58) Field of Classification Search
CPC .... G06Q 30/0269; G06Q 50/01; G06Q 40/08; G06F 18/3053; G06F 3/0481; G06F 17/30994; G06F 3/0489; G06F 3/04842; G06F 2203/04804; G06F 17/3053; G06F 17/30828; G06F 3/0482; H04N 21/4826; G04F 17/40828; G09G 5/14; H04M 1/72522

See application file for complete search history.

(56) References Cited

U.S. PATENT DOCUMENTS 6,904,449 B1    6/2005   Quinones
7,113,917 B2 *  9/2006   Jacobi ................... G06Q 30/02
                                                            705/14.53

(Continued)

OTHER PUBLICATIONS

IBehavior web site, "Demographic Append," published Jul. 31, 2012 (Year: 2012).*

(Continued)

*Primary Examiner* — Eric J Yoon
(74) *Attorney, Agent, or Firm* — Banner & Witcoff, Ltd.

(57) ABSTRACT

An application operating at a mobile computing device may request a set of recommended application tasks for recommendation. The request may identify a user associated with the application, and the user may be associated with a user group based on user profile attributes associated with the user. Application tasks available for selection at the application to may be selected for a set of recommended application tasks based on selection trend data associated with the user group. The set of recommended application tasks may be provided to the application, and the application may configure an application task list that includes the application tasks in the set of recommended application tasks.

18 Claims, 12 Drawing Sheets

(51) Int. Cl.
*H04W 4/08* (2009.01)
*G06F 3/0484* (2013.01)
*G06F 3/0482* (2013.01)

(56) References Cited

U.S. PATENT DOCUMENTS

| | | | |
|---|---|---|---|
| 8,271,300 B1 | 9/2012 | Goral et al. | |
| 8,407,066 B2 | 3/2013 | Gentry et al. | |
| 8,468,164 B1 * | 6/2013 | Paleja | G06F 17/30867 |
| | | | 707/767 |
| 8,560,935 B2 | 10/2013 | Jaffe et al. | |
| 8,799,463 B1 * | 8/2014 | Svedloff | G06Q 30/06 |
| | | | 709/225 |
| 8,805,709 B2 | 8/2014 | Grosso et al. | |
| 2004/0181435 A9 | 9/2004 | Snell et al. | |
| 2007/0220554 A1 * | 9/2007 | Barton | H04N 21/4668 |
| | | | 725/46 |
| 2009/0210256 A1 | 8/2009 | Upadhyayula et al. | |
| 2011/0320307 A1 * | 12/2011 | Mehta | G06Q 30/0641 |
| | | | 705/26.7 |
| 2012/0054592 A1 | 3/2012 | Jaffe et al. | |
| 2012/0066004 A1 | 3/2012 | Lee | |
| 2014/0164401 A1 * | 6/2014 | Kyaw | G06F 16/9535 |
| | | | 707/751 |

OTHER PUBLICATIONS

Experian Marketing Services, List Services Catalog, published Fall 2011-2012 (Year: 2012).*
Parhi, Pekka et al., "Target Size Study for One-hand Thumb Use on Small Touchscreen Devices," MobileHCI'06, Sep. 12-15, 2006, Helsinki, Finland, ACM, pp. 203-210, downloaded from https://www.microsoft.com/en-us/research/wp-content/uploads/2006/01/parhi-mobileHCI06.pdf (Year: 2006).*
Shimon, Shaikh et al., "Exploring User-Defined Back-of-Device Gestures for Mobile Devices," MobileHCI'15, Aug. 24-27, 2015, Copenhagen, Denmark, ACM, pp. 227-232, downloaded from https://dl.acm.org/doi/pdf/10.1145/2785830.2785890 (Year: 2015).*
Bylaws. Special Interest Group on Computer-Human Interaction. (SIGCHI). Retrieved from <http://www.sigchi.org/about/bylaws> on Oct. 9, 2015.
Charter. ACM Transactions of Computer-Human Interaction (TOCHI). Retrieved from <http://tochi.acm.org/general/> on Oct. 9, 2015.

* cited by examiner

CONFIGURING AN APPLICATION TASK LIST OF AN APPLICATION BASED ON PREVIOUS SELECTIONS OF APPLICATION TASKS

CROSS-REFERENCE TO RELATED APPLICATIONS

This application is a continuation of U.S. patent application Ser. No. 13/791,308 entitled "Configuring an Application Task List of an Application Based on Previous Selections of Application Tasks" and filed on Mar. 8, 2013 which is incorporated by reference herein in its entirety.

TECHNICAL FIELD

The present invention generally relates to computer applications and relates in particular to approaches for presenting application tasks at a user interface display of an application on a computing device.

BACKGROUND

The proliferation of mobile computing devices has increased the potential to place knowledge and functionality at the fingertips of users. As a result, the mobile application industry continues to grow at a rapid pace. One industry that has seen an increase in the use of mobile technology is the insurance industry. Applications designed to operate at mobile computing devices, e.g., mobile cellular telephones and smartphones, have streamlined some of the interactions between insurance providers and insurance customers. Such applications enable insurance customers to carry out various insurance-related activities at their mobile computing devices.

With respect to these mobile applications, there remains room for improvement. Due to the broad number of insurance topics and activities associated with purchasing, maintaining, and utilizing insurance, customers—in particular new or inexperienced insurance customers—may find the subject of insurance to be relatively complex. Additionally, the size of the displays at mobile computing devices may limit or constrain the design of user interfaces for insurance applications. Therefore, given the large amount of potential insurance-related activities and insurance-related topics, there exists a need for improved approaches to presenting this functionality and information at an insurance application on a mobile computing device.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

An insurance application operating at a mobile computing device may operate at the direction of a user utilizing the insurance application. The insurance application may request a set of recommended insurance tasks for a recommendation engine. The request may identify a user associated with the insurance application, and the recommendation engine may associate the user with a user group based on user profile attributes associated with the user. The recommendation engine may determine one or more tasks available for selection at the insurance application to include in the set of recommended insurance tasks based on selection trend data associated with the user group. The recommendation engine may provide the set of recommended insurance tasks to the insurance application, and the insurance application may configure an insurance task list that includes insurance tasks of the set of recommended insurance tasks. The set of recommended insurance tasks may be a set of recommended insurance questions.

The recommendation engine may obtain a relevancy score for the insurance tasks available at the insurance application and determine whether to include the insurance tasks in the set of recommended insurance tasks based on the respective relevancy scores. Relevancy scores may be respectively associated with user groups or individual user attributes. The recommendation engine may also aggregate relevancy scores to obtain an aggregated relevancy score and determine whether to include an insurance task in the set of recommended insurance tasks based on the aggregated relevancy score. User attributes may also be respectively associated with weight values such that an aggregated relevancy score is also based on the weight values associated with the user attributes. The recommendation engine may include an insurance task in the set of recommended insurance tasks when an associated relevancy score meets or exceeds a relevancy threshold. The recommendation engine may also exclude an insurance task from the set of recommended insurance tasks when an associated relevancy score is less than the threshold. A relevancy score may correspond to the number of times the insurance task is selected by users of the user group divided by the number of times the insurance task is displayed to the user group. Relevancy scores may be further based on selection frequency data associated with the user.

When the user selects one of the insurance tasks at the insurance application, a selection message may be provided that identifies the selected insurance task. The relevancy score may be increased in response to receipt of the selection message indicating that the user selected the insurance task. The selection message may also identify insurance tasks that were displayed to the user but not selected by the user. The relevancy score for insurance tasks that were not selected by the user may be decreased in response to receipt of the selection message. The selection message may also indicate that the insurance task selected by the user was not included in the set of recommended insurance tasks.

When an insurance event occurs, an insurance task configured for responding to the insurance event may be included in the set of recommended insurance tasks and suggested to the user. Notification may be provided indicating that the insurance event occurred, and the insurance task may be suggested to the user. The user may also be prompted to accept or reject the insurance task suggested for responding to the insurance event, and a selection message may be provided indicating whether the user accepted or rejected the suggestion. Insurance events may include the start of an insurance payment period, the filing of a new insurance claim associated with the user, an update to an existing claim associated with the user, and a determination of asset loss.

A data store may be configured to store user profile data and selection trend data, a user interface at the insurance application may be configured to display the insurance task list, and a display manager may be configured to configure the insurance task list. Additionally, a processor may be configured to execute computer-readable instructions stored on a non-transitory computer-readable storage medium that are directed towards carrying out the steps set forth above.

DETAILED DESCRIPTION

Figure 1:
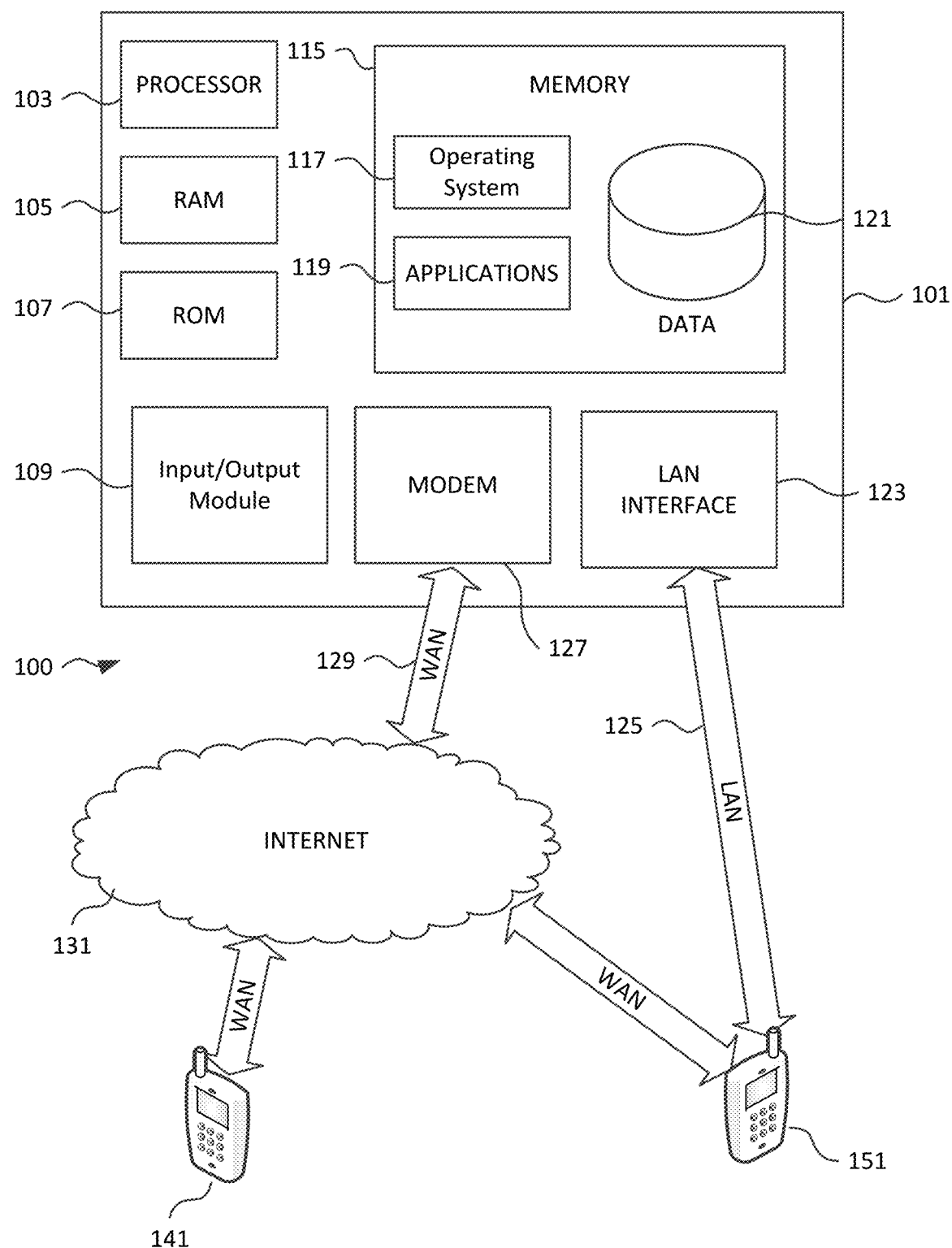
FIG. 1 is an example of an implementation of an operating environment in which various aspects of the disclosure may be implemented.

Aspects of this disclosure are directed towards assisting a user carry out an insurance transaction at an insurance application operating at a mobile computing device. More particularly, aspects of this disclosure are directed towards determining which insurance tasks available for selection at an insurance application are relevant to a user and configuring a list of insurance tasks presented to the user based, at least in part, on user profile data for the user. In particular, selections made by multiple users of respective insurance applications are monitored such that those selections may be leveraged when determining which insurance-related tasks may be relevant to a user. A user may be categorized as belonging to a particular user group, and the selections made by other users assigned to that group may be used to recommend insurance-related tasks to the user. Automatically configuring the list of insurance tasks may include, for example, selecting which insurance tasks to include in the list and, additionally or alternatively, arranging the insurance tasks included in the list based on relevancy to the user. Configuring the list of insurance tasks may also include changing the prominence of insurance tasks (e.g., via highlight, font size, and other text styling) as well as explicitly suggesting one insurance task to the user and prompting the user to accept or reject the suggestion. As discussed in more detail below, the occurrence of an insurance event may trigger the insurance task suggestion.

An insurance task as used in this description refers to a process or functional workflow the user may initiate and carry out via the insurance application operating on the mobile computing device. As discussed further below, the insurance application may present the available insurance tasks in a user interface display. The user interface display that includes the list of available insurance tasks may also include user interface elements for receiving user input to initiate the insurance task or carry out the insurance task once initiated. The insurance tasks included in the insurance task list may not include all of the insurance tasks potentially available for selection at the insurance application. In other words, the insurance tasks included in the list of insurance tasks may be a subset of the set of insurance tasks available for selection at the insurance application. Examples of insurance tasks that may include, for example: initiating a conversation with an insurance agent; reporting an accident; submitting an insurance payment; retrieving insurance portfolio information; requesting a quote for an insurance policy; retrieving insurance policy information; asking an insurance-related question; selecting an insurance task option; and other insurance-related tasks. It will be appreciated that additional or alternative insurance tasks may be available at example embodiments of the insurance application. It will also be appreciated that, while the disclosures are discussed within the context of a mobile application operating at a mobile computing device, aspects of the disclosure may also be employed at a web application configured to operate at a web interface via the Internet or at a standalone desktop application configured to operate at a personal computer.

As insurance tasks may refer to the submission of an insurance question or the selection of an insurance task option, it will also be appreciated that the list of insurance tasks may, in some example embodiments, be a list of insurance questions or a list of insurance task options associated with an insurance task selected by the user. Accordingly, aspects of this disclosure may be employed to determine which insurance questions or insurance task options are relevant to a user and automatically configure a list of insurance questions or insurance task options determined to be relevant to the user. Configuring the list of insurance questions or insurance task options may likewise include selecting which insurance questions or insurance task options to include in the list and, additionally or alternatively, arranging the insurance questions or insurance task options included in the list based on relevancy to the user.

In other words, aspects of the disclosure are directed towards predicting which insurance tasks, questions, or options a user is likely to select at the insurance application, recommending insurance tasks, questions, or options for display to the user based on these predictions, and providing a user interface display that makes the recommended insurance tasks, questions, or options conveniently accessible for selection by the user. In order to predict which insurance tasks, questions, or options will be relevant to a user, the selection trend data store collects and stores selections of multiple users respectively operating multiple insurance applications. The recommendation engine analyzes the selection trend data to determine which insurance task, questions, or options are likely to be relevant to the user.

When recommending a set of insurance tasks, questions, or options for display to a user, the user may be categorized, assigned to, or otherwise associated with a user group. In turn, the insurance tasks, questions, or options relevant to that user group may be included in the set of recommended insurance tasks, questions, or options for the user. Relevancy may be based, for example, on selection frequency. That is, the recommendation engine may determine that an insurance task, question, or option frequently selected by multiple users of a user group are likely to be relevant to individual users of the user group. These and other aspects will be discussed in further detail below.

Referring to FIG. 1 an example of an implementation of an operating environment in which various aspects of the disclosure may be implemented is shown. In accordance with various aspects of the disclosure, methods, computer-readable media, and apparatuses are disclosed through which insurance tasks may be recommended for display at an insurance application operating at a mobile computing device. In certain aspects, an insurance task recommendation system may automatically generate a set of recommended insurance tasks for presentation at a user interface display of the insurance application. The automated procedures may utilize various hardware components (e.g., processors, communication servers, memory devices, sensors, etc.) and related computer algorithms to determine which insurance tasks are relevant to a user that utilizes the insurance application to carry out insurance tasks. The insurance task recommendation system may determine which insurance tasks are relevant to a user based, at least in part, on user profile attributes of the user.

FIG. 1 illustrates a block diagram of an insurance task recommendation system 100 (e.g., a computer server) that may be used according to an illustrative embodiment of the disclosure. The server 101 may have a processor 103 for controlling operation of various aspects of the insurance task recommendation system 100 and its associated components, including RAM 105, ROM 107, input/output module 109, and memory 115. The insurance task recommendation system 100 may include multiple servers 101 for controlling operation of respective aspects of the insurance task recommendation system.

I/O module 109 may include a microphone, keypad, touch screen, and/or stylus through which a user of the server 101 may provide input, and may also include one or more of a speaker for providing audio output and a video display device for providing textual, audiovisual, or graphical output. Software may be stored within the memory 115 to provide instructions to the processor 103 for enabling the server 101 to perform various functions. For example, the memory 115 may store software used by the server 101, such as an operating system 117, application programs 119, and an associated database 121. The processor 103 and its associated components may allow the server 101 to run a series of computer-readable instructions to determine which insurance tasks are relevant to a user and generate a set of recommended insurance tasks. The server 101 may operate in a networked environment supporting connections to one or more remote computers, such as terminals 141 and 151. The terminals 141 and 151 may be personal computers or servers that include many or all of the elements described above relative to the server 101. Also, terminal 141 or 151 may be data stores for storing data relating to insurance tasks, user profiles, and insurance task selection trends. In yet other embodiments, terminals 241 and 251 may represent mobile computing devices such as laptop computing devices, tablet computing devices, palmtop computing devices, mobile cellular telephones, and the like.

The network connections depicted in FIG. 1 include a local area network (LAN) 125 and a wide area network (WAN) 129, but may also include other networks such as a metropolitan area network (MAN) or a cellular network. When used in a LAN networking environment, the server 101 is connected to the LAN 125 through a network interface or adapter 123. When used in a WAN or MAN networking environment, the server 101 may include a modem 127, the network interface or adapter 123, or other means for establishing communications over the WAN 129 (or MAN), such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to analyzing user profile data to determine which insurance tasks are relevant to a user and generating a set of recommended insurance tasks for the user. As noted above, multiple servers 101 having respective application programs 119 may be employed to implement and invoke this functionality. The insurance task recommendation system 101 or the terminals 141 or 151 may also be mobile terminals including various other components, such as a battery, speaker, camera, and antennas (not shown).

The disclosure is operational with numerous other general purpose or special purpose computing system environments or configurations. Examples of well-known computing systems, environments, or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices or systems that are linked through a communications network. In a distributed computing environment, program modules may be located in both local and remote computer storage media including non-transitory memory storage devices, such as a hard disk, random access memory (RAM), and read only memory (ROM).

Figure 2:
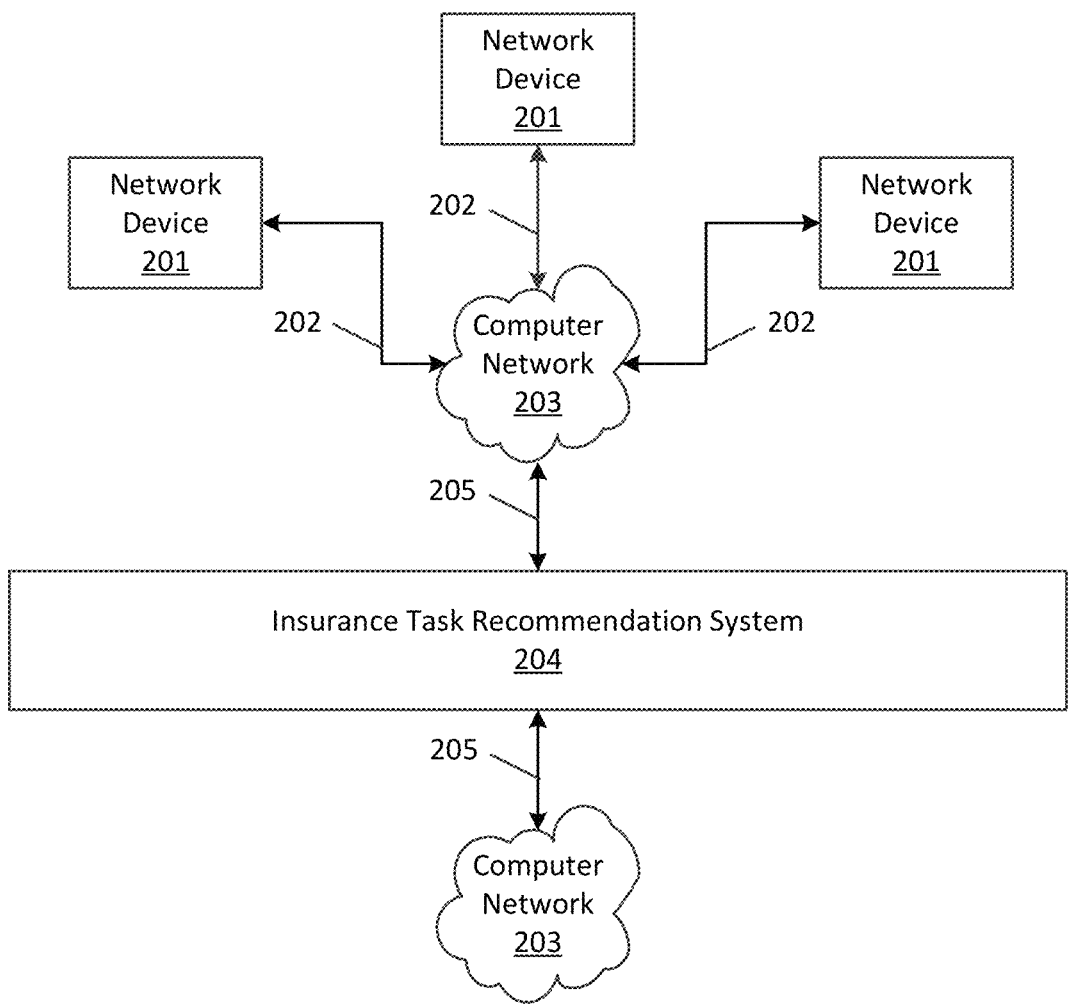
FIG. 2 is an example of an implementation of a system of network devices and servers that may be used to implement the processes and functions of certain aspects of the present disclosure.

Referring to FIG. 2, an illustrative operating environment is shown in which various aspects of the disclosure may be implemented. A system 200 for implementing methods according to the present disclosure is shown. As illustrated, the system 200 may include one or more network devices 201. The devices 201 may be local or remote, and are connected by one or more communications links 202 to a computer network 203 that is linked via communications links 205 to an insurance task recommendation system 204. In certain embodiments, the network devices 201 may run different algorithms used by the server 204 for analyzing user profile data and recommending insurance tasks based on user profile data. In yet other embodiments, the network devices 201 may represent the mobile computing devices at which the insurance applications operate. In the system 200, the insurance task recommendation system 204 may be one or more of any suitable server, processor, computer, or data processing device, or combination of the same.

Computer network 203 may be any suitable computer network including the Internet, an intranet, a metropolitan area network (MAN), a wide-area network (WAN), a local-area network (LAN), a wireless network, a digital subscriber line (DSL) network, a frame relay network, an asynchronous transfer mode (ATM) network, a virtual private network (VPN), or any combination of any of such networks. Communications links 202 and 205 may be any communications links suitable for communicating between network devices 201 and server 204, such as network links, dial-up links, wireless links, hard-wired links, etc. The example method steps discussed below may be implemented by one or more of the components in FIGS. 1-2 or other components, including other computing devices.

Figure 3A:
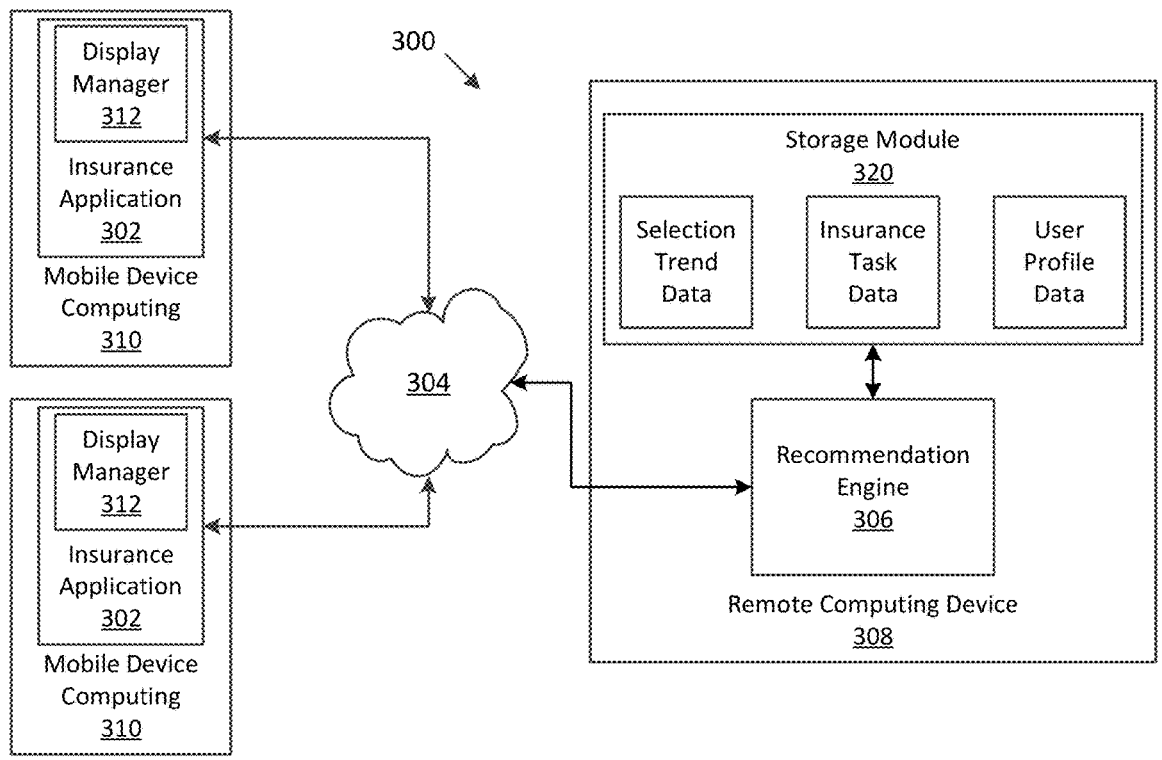
FIG. 3A is an example of an implementation of an insurance task recommendation system.

In FIG. 3A, an example of an implementation of an insurance task recommendation system 300 is shown. As seen in FIG. 3A, the insurance task recommendation system 300 may include an insurance application 302 operating in signal communication via a network 304 with a recommendation engine 306 at a remote computing device 308. The insurance applications 302 are designed to assist a user with various insurance-related tasks the user desires to carry out. The insurance application 302 may be configured to operate on a mobile computing device 310 and may include a display manager 312 for configuring the insurance task list presented at a user interface display. The display manager 312 may configure the insurance task list based on a set of recommended insurance tasks received from the recommendation engine 306. In FIG. 3A, multiple insurance applications 302 at respective mobile computing devices 310 are shown to be in signal communication with the recommendation engine 306 at the remote computing device 308. Accordingly, it will be appreciated that the recommendation engine 306 may be in signal communication with multiple insurance applications 302 to respectively provide insurance task recommendations to those insurance applications.

The recommendation engine 306 may receive a request from an insurance application 302 for a set of recommended insurance tasks to present to the user in an insurance task list. In response to receipt of the request, the recommendation engine 306 may identify a user group the user belongs to, determine which insurance tasks are relevant to that user group, and include the relevant insurance tasks in the set of recommended insurance tasks provided to the insurance application 302. In this regard, the recommendation engine 306 may be in signal communication with one or more data stores. In this example, the insurance task recommendation system 300 includes a data store 314 that stores insurance task data, a data store 316 that stores user profile data, and a data store 318 that stores selection trend data. The data stores 314-318 may be part of one or more storage modules 320 at the remote computing device 308.

Insurance task data may include, for example, data indicating which insurance tasks are available at the insurance application 302, data indicating which insurance questions are available at the insurance application, and other data related to insurance tasks. Selection trend data may include data indicating the respective task selections of users at the insurance applications 302. In some example embodiments, the selection trend data may correspond to selection frequencies, e.g., values indicating the number of times users have respectively selected various insurance tasks at the insurance application 302.

User profile data may include, for example, data describing the attributes of the users of the insurance applications 302, e.g., a set of user attributes. User profile data may include, for example, age, gender, marital status, geographic location, education level, education status, employment experience, credit score, and other demographic information. Because aspects of the disclosure are directed towards recommending insurance tasks, user profile data may also include insurance-related information such as, for example, insurance products and services purchased, insurance premiums, insurance policy deductibles, insurance policy coverage limits, and other insurance-related information. In particular, a user may operate the insurance application 302 with respect to vehicle insurance, and therefore the user profile data may further include vehicle insurance-related information such as, for example, vehicle make, model, year, country of origin, vehicle classification, vehicle features, years of driving experience, average yearly mileage, historical driving record, insurance claims record, and other vehicle-related or driving-related information. It will be appreciated that user profile data may include information relating to other types of insurance products and services, e.g., business insurance, homeowners insurance, renters insurance, boat insurance, flood insurance, and so forth.

A database management system (not shown) at the remote computing device 308 may implement an insurance task data model that models the relationships between the insurance task data, the user profile data, and the selection trend data. The insurance task data model may be implemented, for example, as one or more databases that define respective database tables, attributes, and relationships corresponding to the insurance task data model. The respective data stores may thus store and retain the data described above as respective related or unrelated records in accordance with the insurance task data model. The relationships between the insurance tasks, user profiles, and selection trends will be discussed further below with reference to FIGS. 5A-B.

Figure 3B:
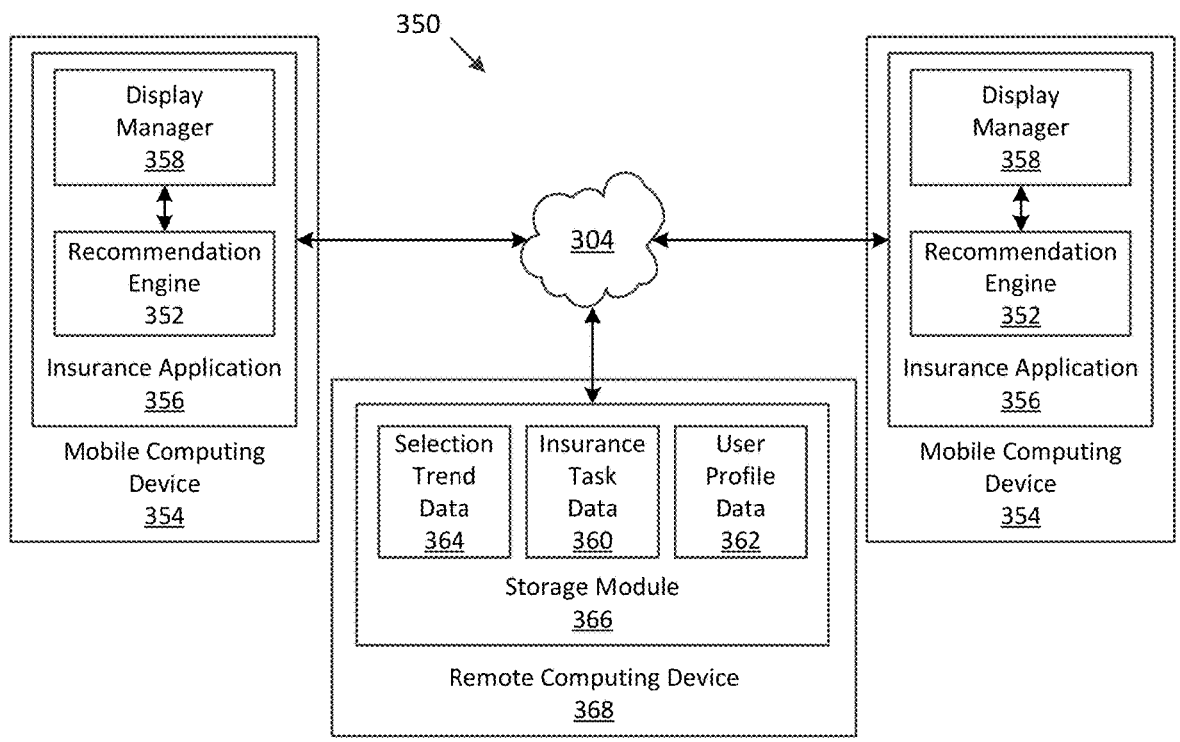
FIG. 3B is an example of an alternative implementation of an insurance task recommendation system.

Referring now to FIG. 3B, an example of an alternative implementation of an insurance task recommendation system 350 is shown. As seen in FIG. 3B, in some example embodiments, the recommendation engine 352 may reside at the mobile computing device 354 as a component of the insurance application 356. The recommendation engine 352, in this example, is still in signal communication with the display manager 358 of the insurance application 356 in order to provide insurance task recommendations. In this alternative embodiment, however, the recommendation engine 356 may access the insurance task data, user profile data, and selection trend data via a network 360 from respective data stores 360, 362, and 364 located at storage module 366 of a remote computing device 368. It will be appreciated with the benefit of this disclosure that additional or alternative configurations, designs, or architectures for the insurance task recommendation systems 300 and 350 may be selectively employed.

Figure 4:
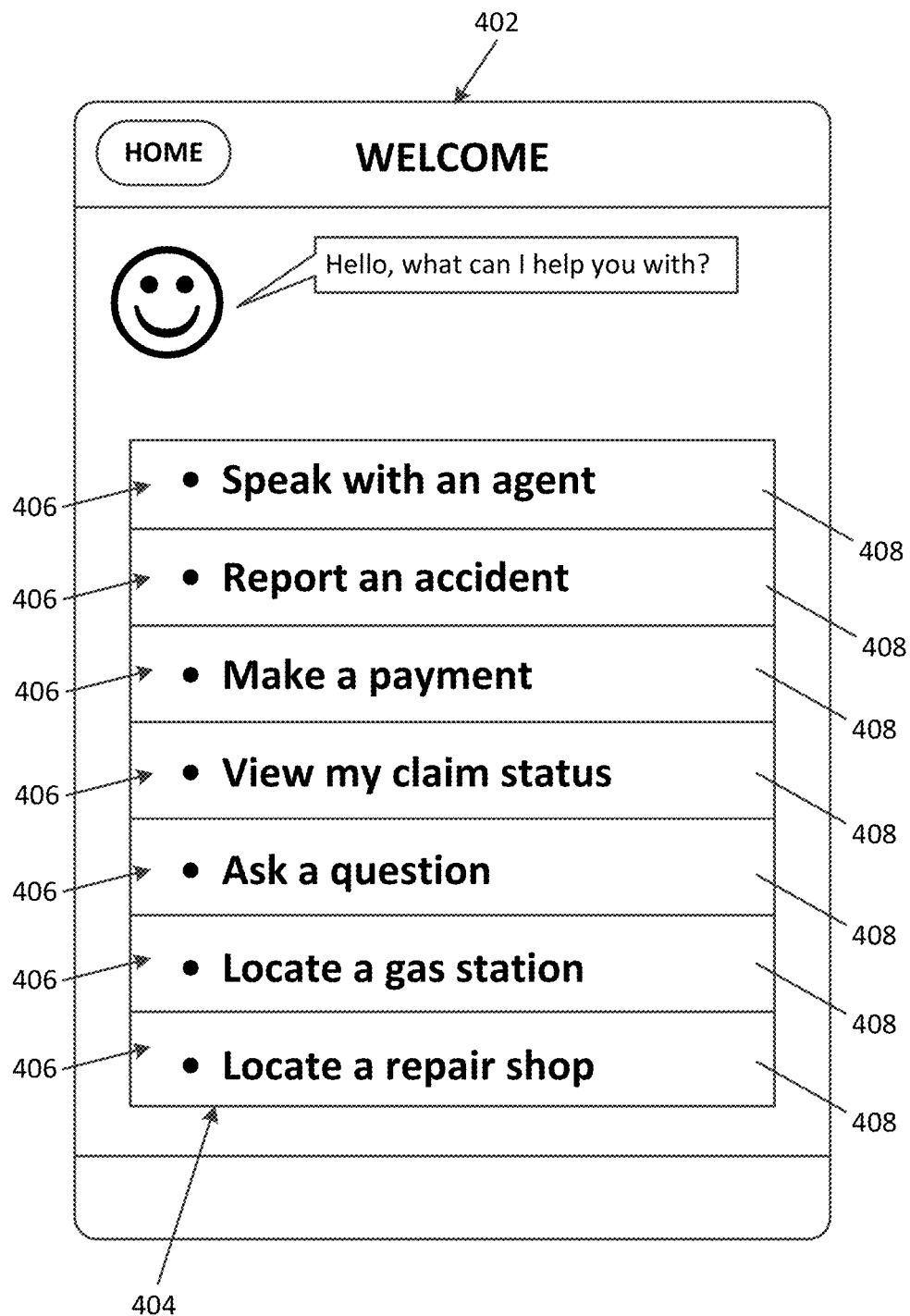
FIG. 4 is an example of an implementation of a user interface display of an insurance application.

With reference to FIG. 4, an example of an implementation of a user interface display 400 of an insurance application 402 is shown. As seen in FIG. 4, the insurance application 402 may present an insurance task list 404 at the user interface display 400. As noted above, the insurance task list 404 presented at the user interface display 400 may be a list of insurance tasks 406, insurance questions, or insurance task options. The user interface display 400 may include respective user interface elements 408 (e.g., buttons) for selecting the insurance tasks 406 included in the insurance task list 404. As noted above, a display manager of the insurance application 402 may configure the insurance task list 404 based on a set of recommended insurance tasks received from the recommendation engine. Accordingly, the insurance task list 404 presented at the user interface display 400 may not include all of the insurance tasks available at the insurance application 402 or even all of the insurance tasks in the set of recommended insurance tasks. Instead, the display manager may select one or more of the recommended insurance tasks to include in the insurance task list 404 presented at the user interface display 400. The display manager may also arrange the insurance tasks 406 included in the insurance task list 404 based on relevancy to the user. As an example, the display manager may order the insurance tasks 406 according to relevancy where, e.g., the display manager places the relatively more relevant insurance tasks toward the top of the insurance task list 404. In some example embodiments, the display manager may place the insurance task determined to be most relevant at the top of the insurance task list 404.

Selecting one of the insurance tasks 406 may initiate a workflow that walks the user through a series of steps to carry out the insurance task. Upon arriving at some steps, the insurance application 402 may prompt the user to provide information or to select an option (e.g., an insurance task option). The insurance application 402 may proceed through various branches of the workflow depending on which insurance task options the user selects. As noted above, the insurance task list 404 may be a list of insurance task options, and the insurance tasks included in the insurance task list may be insurance task options. Accordingly, the insurance application 402 may request from the recommendation engine a set of recommended insurance task options, which the insurance application may include in the insurance task option list 404 presented to the user. The display manager of the insurance application 402 may similarly configure the insurance task option list 404 based on relevancy to the user. As also noted above, an insurance task list 404 may be a list of insurance questions and the insurance tasks included in the insurance task list may be insurance task questions. As a result, the display manager of the insurance application 402 may request from the recommendation engine a set of recommended insurance questions, which the display manager may include and configure in the insurance question list 404 presented to the user.

Figure 5A:
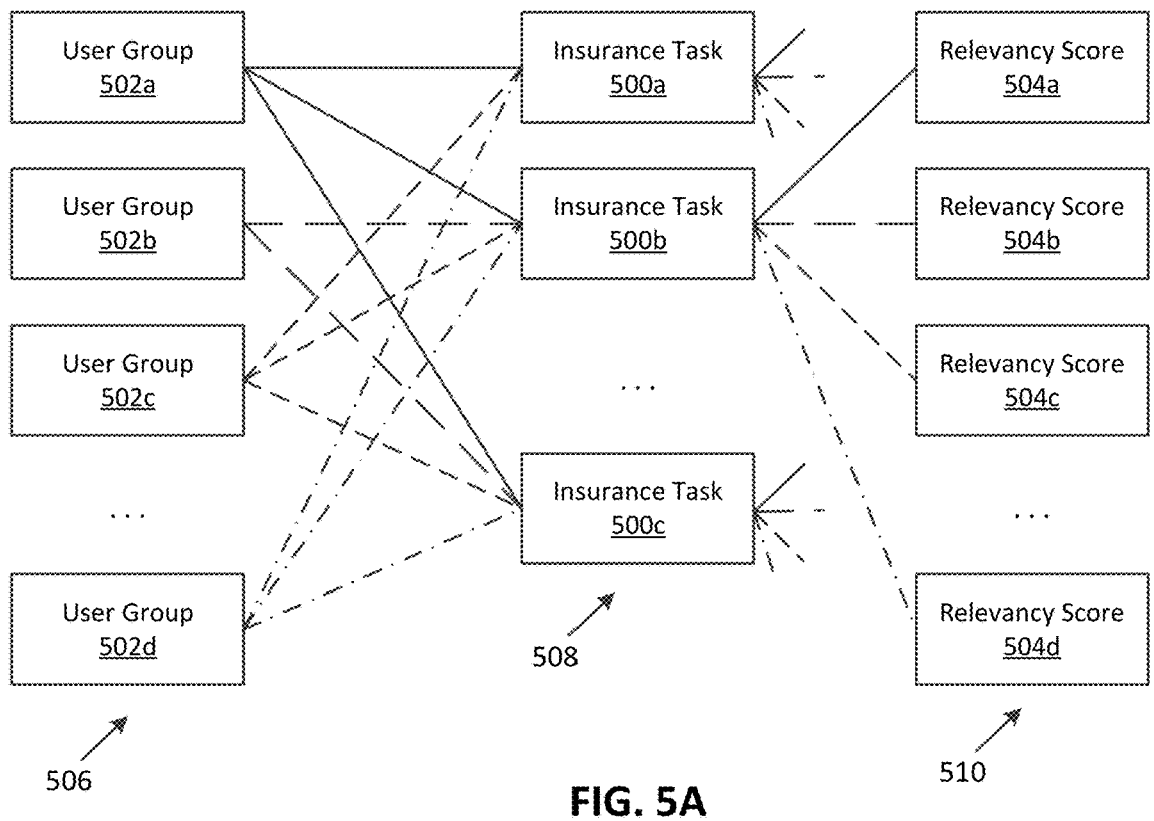
FIG. 5A is a block diagram illustrating aspects of an example of an implementation of an insurance task data model.
Figure 5B:
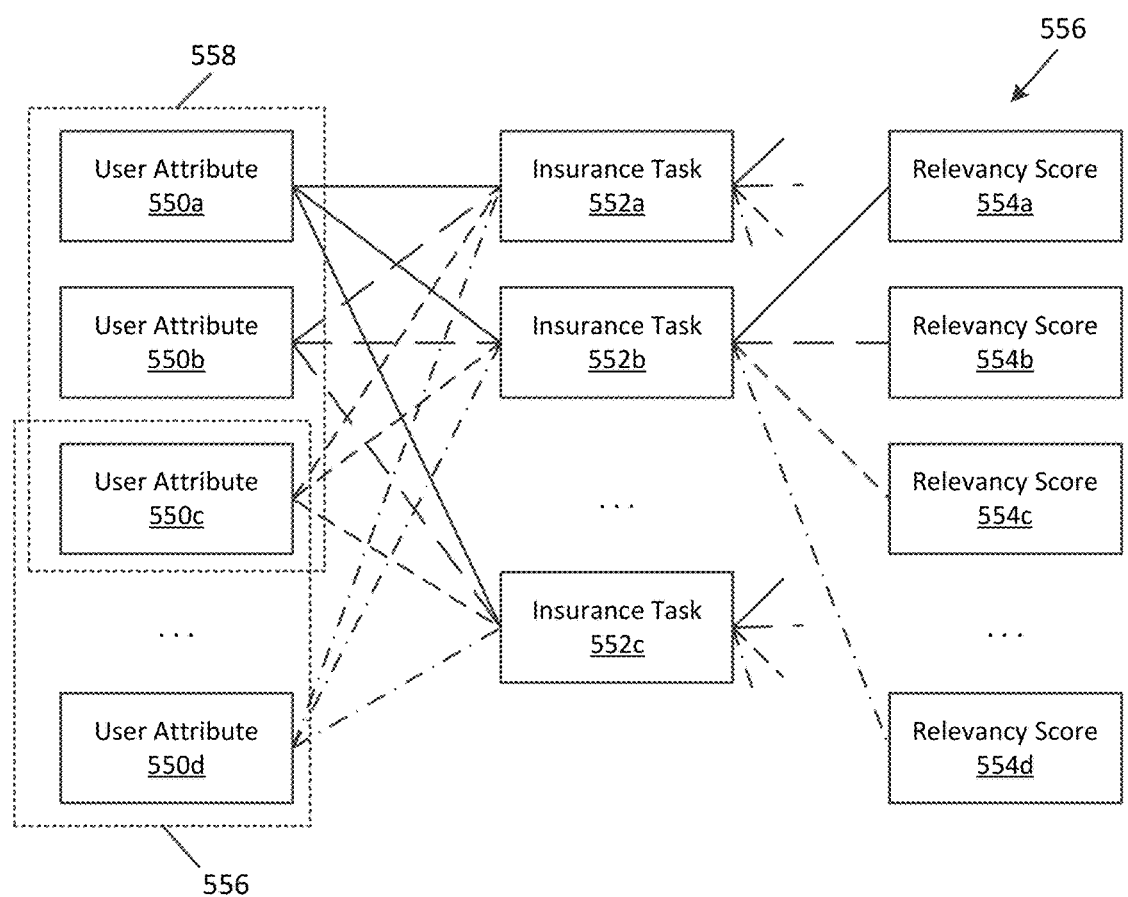
FIG. 5B is a block diagram illustrating aspects of an example of an alternative implementation of an insurance task data model.

Referring now to FIG. 5A and FIG. 5B, respective block diagrams illustrating example relationships between insurance tasks, user profile data, and selection trend data is shown. In FIGS. 5A-B, the example insurance tasks 500a-c represent insurance tasks that may be available for selection at the insurance application. Example embodiments of the insurance task management system may selectively employ various approaches to storing and maintaining selection trend data. In one approach, as illustrated in FIG. 5A, relevancy is determined for user groups 502a-d. Accordingly, user groups may be respectively paired with each insurance task 500a-c available at the insurance application, and respective relevancy scores 504a-d may be associated with each group-task pairing. In FIG. 5A, a set of user groups 506 paired with a set of insurance tasks 508 is shown. As seen in FIG. 5A, one of the insurance tasks 500b is associated with a set of relevancy scores 510. The relevancy scores 504a-d for the insurance task 500b quantify the relevancy of the insurance task to the respective user groups 502a-d the insurance task is paired with. In this way, the insurance recommendation system may advantageously rank the insurance tasks 500a-c to determine which insurance tasks are relatively more relevant to the users associated with the user groups 502a-d and which insurance tasks are relatively less relevant to those users. For clarity, the sets of relevancy scores respectively associated with the other insurance tasks 500a and 500c have been omitted.

To provide an example, consider that the insurance task recommendation system defines three user groups {U1, U2, U3} and that two insurance tasks {T1, T2} are available for selection at the insurance application. In this example, the group-task pairings may include a total of six group-task pairings {U1-T1, U1-T2, U2-T1, U2-T2, U3-T1, U3-T2}, and a total of six relevancy scores that indicate the relevancy of the insurance tasks to the user group the insurance task is paired with. If the recommendation engine determines that a user belongs to user group U1, then the recommendation engine may analyze the relevancy scores respectively associated with group-task pairings U1-T1 and U1-T2 to determine whether insurance task T1 or insurance task T2 is more relevant to the user.

In response to receipt of a user selection from the insurance application of a user, the recommendation engine may adjust a relevancy score (e.g., up or down) depending on whether the user selected the insurance task. A relevancy score may be, for example, an absolute selection frequency that simply counts the number of times a particular insurance task was selected. The insurance application may be configured to provide an indication to the recommendation engine when an insurance task is selected, and the recommendation engine may increment the selection frequency value for the group-task pairing in response. In some embodiments, the relevancy score may be a percentage of the number of times a particular insurance task was selected with respect to the number of times the insurance task was displayed to the user. The insurance application may be additionally configured provide an indication to the recommendation engine when an insurance application displays an insurance task, and the recommendation engine may increment a displayed frequency value for the group-task pairing in response. Accordingly, the relevancy score may be determined by dividing the selection frequency value by the displayed frequency value, e.g., number of times selected divided by number of times displayed. In other embodiments, the relevancy score may simply be a value that is normalized from a selection frequency value, selection percentage, combinations thereof, or according to some other approach suitable for determining the relevancy of an insurance task to a user group.

The insurance task recommendation system may employ various approaches to defining user groups. The insurance task recommendation system may define user groups based on the user profile attributes of the users that utilize the insurance application. As an example, the insurance task recommendation system may define user groups based on age, e.g., one user group for users aged 16-25, one user group for users aged 26-65, and one user group for users aged 66 and above. As another example, the insurance task recommendation system may define user groups based on geographic location, e.g., one user group for users that live in a city, one user group for users that live in the suburbs, and one user group for users that live in rural areas. It will be appreciated that the insurance task recommendation system may additionally or alternatively define user groups based on combinations of user profile attributes, e.g., {age, geographic location}, {age, geographic location, vehicle classification}, {age, gender, marital status, geographic location, vehicle make, model, insurance premium, insurance deductible, . . . , driving record}, and so forth. As seen in these examples, the permutations of potential user groups can become relatively large depending on the number of user profile attributes used to define the user groups and the possible values for those attributes.

FIG. 5B, illustrates an alternative approach to determining insurance task relevancy. In FIG. 5B, user profile attributes 550a-d, rather than user groups, are respectively paired with insurance tasks 552a-c. Accordingly, relevancy scores 554a-d are respectively associated with attribute-task pairings in FIG. 5B. Similar to the insurance tasks 500a-c in FIG. 5A, the insurance tasks 552a-c in FIG. 5B are also associated with a set of relevancy scores 556. The relevancy scores 554a-d for the insurance task 552b likewise quantify the relevancy of the insurance task to the respective user attributes 550a-d the insurance task is paired with. In this way, the recommendation engine may advantageously rank the insurance tasks 552a-c to determine which insurance tasks are relatively more relevant to the users respectively associated with the user attributes 550a-d and which insurance tasks are relatively less relevant to users having those attributes. For clarity, the sets of relevancy scores respectively associated with the other insurance tasks 552a and 552c have been omitted.

A user attribute may correspond to an attribute type and specify a value for the attribute type. Examples of attribute types may include those example attributes identified above, e.g., age, gender, insurance deductible, vehicle make, model, and so on. By way of example, a gender user attribute may specify the values {male, female}; an age user attribute may specify the values {16-25; 26-65; and 66+}; and a vehicle classification user attribute may specify the values {business, commute, personal}. With the benefit of this disclosure, other attribute types and respective values will be appreciated.

By associating relevancy scores 554a-d with task-attribute pairings, the insurance task recommendation system may define user groups 558 and 560 in an ad hoc fashion by selecting the user attributes 550-d for a desired user group. In the user groups shown by way of example in FIG. 5B, user group 558 includes user attributes 550a, 550b, and 550c and user group 560 includes user attributes 550c and 550d. The insurance task recommendation system may select relatively few user attributes to define a broad user group, e.g., a user group defined by age and gender such as {16-25, female}. Accordingly, the recommendation engine may determine which insurance tasks are relevant to a 16-25 year old female user of the insurance application based on the selections of insurance tasks from other 16-25 year old female users as indicated by the relevancy scores for those attributes. The insurance task recommendation system may also select relatively many user attributes to define a narrow user group, e.g., a user group defined by age, gender, marital status, and vehicle type such as {25-35, male, unmarried, Japanese vehicle}. In this example, the recommendation engine may determine which insurance tasks are relevant to a 30 year old unmarried male that drives a Japanese vehicle based on the selections of insurance tasks from other users that match these attributes as indicated by the relevancy scores for those attributes. It will be appreciated that a user group may be defined by a single attribute, in which case the disclosures set forth above with respect to FIG. 5A are applicable.

Figure 6:
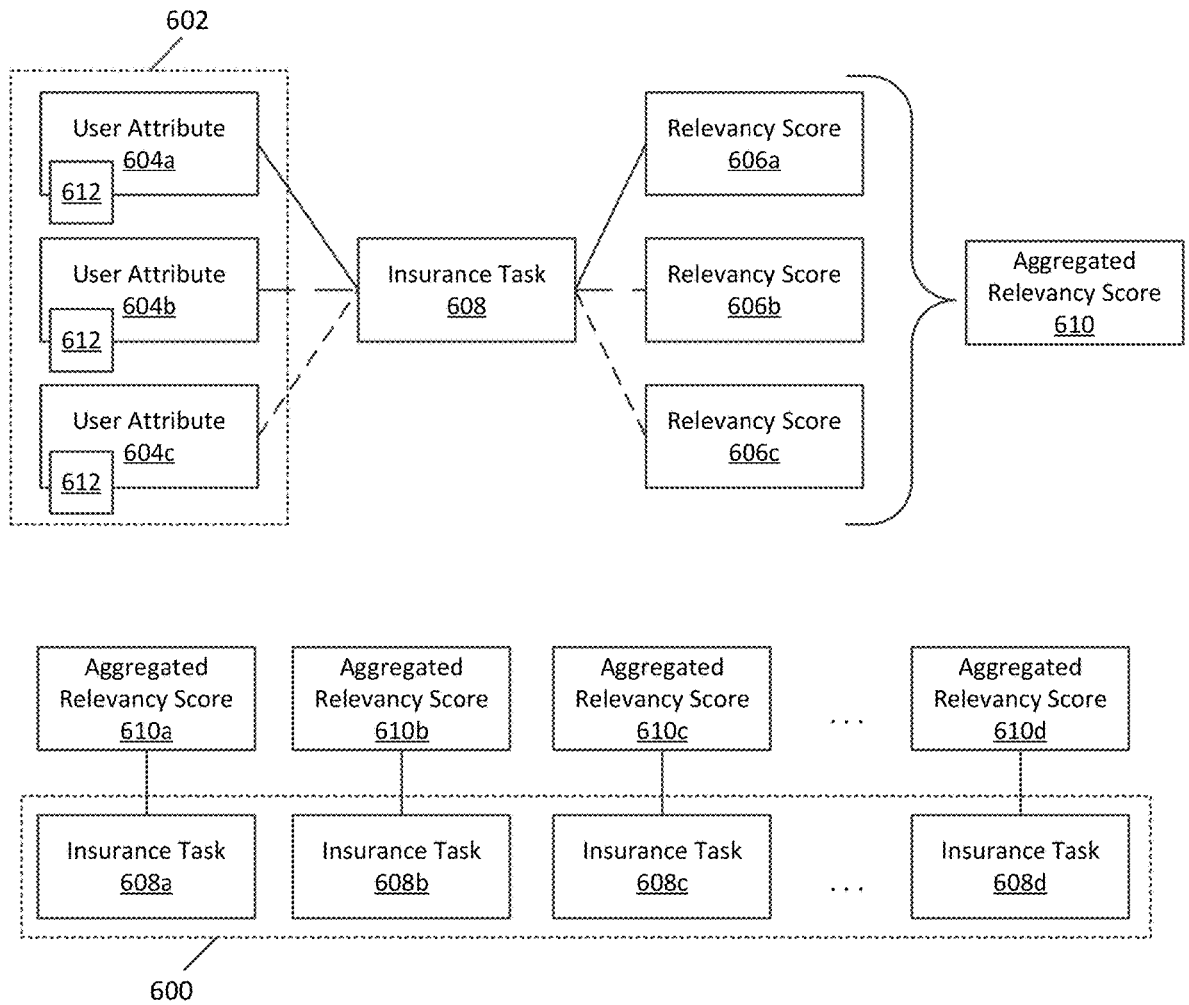
FIG. 6 is a block diagram illustrating aspects of an approach to determining insurance task relevancy.

Because the relevancy scores 554a-d in FIG. 5B are associated with attribute-task pairings rather than group-task pairings, the recommendation engine may aggregate the relevancy scores associated with the attribute-task pairings in order to obtain an overall or aggregated relevancy score for a defined user group. Referring to FIG. 6 a block diagram illustrating aspects of an approach to determining insurance task relevancy scores is shown. As seen in FIG. 6, the recommendation engine may generate a set of recommended insurance tasks 600 for a user group 602 defined by three user attributes 604a-c. The recommendation engine may obtain the individual relevancy scores 606a-c for an insurance task 608 paired with the user attributes 604a-c of the user group 602. The recommendation engine may combine the individual relevancy scores 606a-c for the user attributes 604a-c in order to obtain an aggregated relevancy score 610 for the user group 602. As noted above, the relevancy scores 606a-c may be values that quantify the relevancy of the insurance task 608 to the respective user attributes 604a-c. Accordingly, the recommendation engine may sum the values of the individual relevancy scores 606a-c to obtain the aggregated relevancy score 610.

Moreover, in some example embodiments, weight values 612 may be respectively associated with the user attributes 604a-c, and the recommendation engine may utilize the weight values when determining the aggregate relevancy score 610. In this way, the insurance task recommendation system may advantageously identify some user attributes as relatively more important when determining which insurance tasks are relevant to a user based on the attributes 604a-c of the user. As an example, the fact that a user drives Japanese cars may contribute more to the identification of relevant insurance tasks than the fact that the user is unmarried. Accordingly, the recommendation engine may employ a weight value for a vehicle type attribute that is greater than the weight value for a marital status attribute.

Therefore, in some example embodiments, the recommendation engine may use the following formula to determine an aggregated relevancy score:

$$R_t = \Sigma(R_1 \times w_1) + (R_2 \times w_2) \ldots + (R_n \times w_n)$$ (Eq. 1)

where $R_t$ is the aggregated relevancy score for the user group, $R_n$ is the relevancy score associated with the attribute-task pairing and $w_n$ is the weight value for the user attribute.

The recommendation engine may thus generate a set of recommended insurance tasks 600 based on the aggregated relevancy scores 610a-d respectively associated with the insurance tasks 608a-d. It will be appreciated that the recommendation engine may also generate a set of recommended insurance tasks based on the relevancy scores associated with the group-task pairings discussed above with reference to FIG. 5A. As used in this description a set of recommended insurance tasks refers to a collection or group of one or more insurance tasks.

The recommendation engine may, in some example embodiments, compare a relevancy score (e.g., an aggregated relevancy score 610) to a predetermined relevancy threshold in order to determine whether to include the insurance task 608 associated with the relevancy score in the set of recommended insurance tasks 600. If the relevancy score 610 meets or exceeds (i.e., is not less than) the relevancy threshold, then the recommendation engine may include the insurance task 608 in the set of recommended insurance tasks 600. If the relevancy score 610 is less than the relevancy threshold, then the recommendation engine may exclude the insurance task 608 from the set of recommended insurance tasks 600. As an example, consider a relevancy score range of 0-100. The relevancy threshold, in this example, may be set to 70 such that relevancy scores at or above 70 are included in a set of recommended insurance tasks and relevancy scores below 70 are not included in the set of recommended insurance tasks. If none of the relevancy scores meet or exceed the relevancy threshold, then the recommendation engine may lower the relevancy threshold or simply include one or more of the insurance tasks having the highest relevancy scores.

It will be appreciated that the recommendation engine may, in some example embodiments, employ additional factors to determine which insurance tasks are relevant to the user. In one example, the insurance task recommendation system may maintain individual usage histories for users of the insurance application indicating the frequency with which the users select respective insurance tasks. The recommendation engine may analyze and employ the usage history for a user when determining which insurance tasks are relevant to the user. In some example embodiments, the recommendation engine may include the insurance tasks most frequently selected by a user in the set of recommended insurance tasks. The recommendation engine may also employ additional or alternative formulas to calculate the relevancy score that include values corresponding to the insurance task selection frequencies. Additionally or alternatively, the recommendation engine may increase or decrease the weight value for an insurance task based on how often a user selects the insurance tasks. In this way, the most frequently selected insurance tasks may be displayed and located at or near the top of the insurance task list, and the least frequently selected insurance task may not be displayed at all. In another example, the recommendation engine may include insurance tasks in the set of recommended insurance tasks based on the current state of the insurance application, e.g., where the user has reached a particular step, branch, decision point, and the like in a workflow carried out at the insurance application. It will further be appreciated that the disclosures discussed above regarding relevancy scores are similarly applicable to determining a set of recommended insurance task questions as well as a set of recommended insurance task options.

Figure 7:
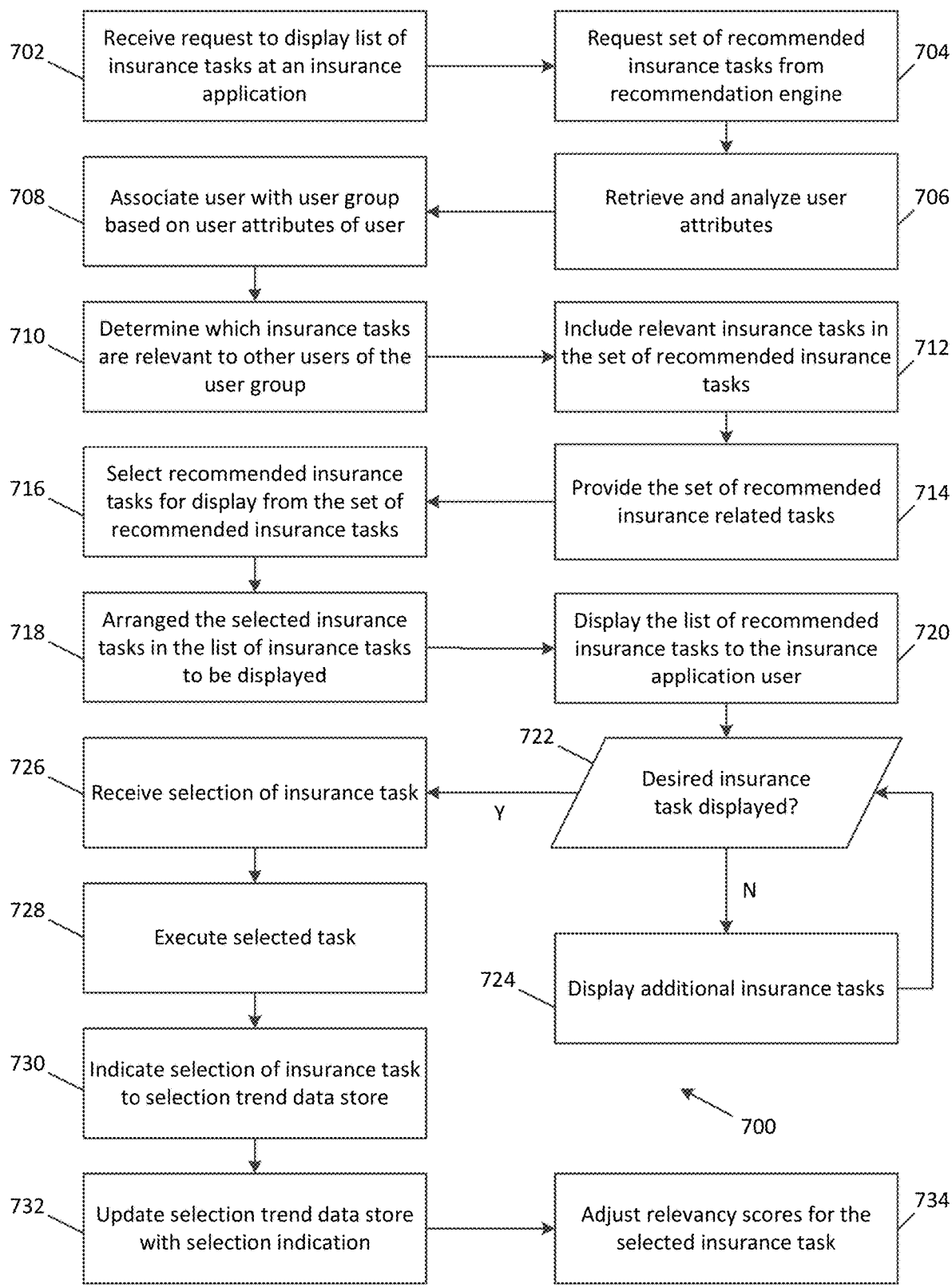
FIG. 7 is a flowchart of example method steps for configuring a list of insurance tasks presented at an insurance application.

Referring now to FIG. 7, a flowchart 700 of example method steps for configuring a list of insurance tasks presented at a user interface display of an insurance application is shown. An insurance application may receive a request to display a list of insurance tasks (step 702). The request to display the list of insurance tasks may, for example, be trigger by launching, activating, or otherwise operating the insurance application at the mobile computing device. In response to the request to display the insurance task list, a set of recommended insurance tasks may be requested from a insurance task recommendation engine (step 704). A display manager of the insurance application may initiate the request for the set of recommended insurance tasks. The request may identify the user of the insurance application, e.g., via name, username, mobile phone number, or other unique identifier. The recommendation engine may use the unique identifier for the user to retrieve user profile attributes associated with the user, e.g., from a user profile data store, and analyze the user attributes associated with the user (step 706). Based on the user attributes, the recommendation engine may identify a user group the user belongs to and assign, categorize, or otherwise associate the user with the user group (step 708).

The recommendation engine may then determine which insurance tasks are relevant to other users associated with the user group (step 710), and include the relevant insurance tasks in the set of recommended insurance tasks for the user (step 712). The recommendation engine may provide the set of recommended insurance tasks to, e.g., the display manager of the insurance application (step 714) such that the insurance task list presented at the user interface display includes at least some of the recommended insurance tasks. In other words, receipt of the set of recommended insurance tasks at the display manager may trigger configuration of the insurance task list based on the set of recommended insurance tasks. Having received the set of recommended insurance tasks, the display manager may select one, some, or all of the recommended insurance tasks for presentation in the insurance task list (step 716). In some example embodiments, the display manager may arrange the recommended insurance tasks presented in the insurance task list (step 718), e.g., by ordering the recommended insurance tasks according to their respective relevancy scores. With the recommended insurance tasks selected and arranged, the insurance application may present the list of recommended insurance tasks at a user interface display of the mobile computing device (step 720), and the user may select a desired insurance task as needed. It will be appreciated that the task recommendation system may identify one or more user groups a user belongs to based upon the social groups the user is associated with on one or more social networks (e.g., Facebook, Twitter, LinkedIn, and the like). The task recommendation system may be in signal communication with a social network (e.g., via computer network 203 in FIG. 2) to identify one or more social groups the user is associated with and one or more individuals that are also associated with those social groups. If one or more individuals of those social groups also utilize the insurance task recommendation system, then the recommendation engine may determine and recommended insurance tasks that are relevant to one or more members of the social group of the user.

If the desired insurance task is not included in the list of recommended insurance tasks (step 722), then the user may request the display of additional insurance tasks (step 724) until the desired insurance task is displayed. The insurance application may receive user input corresponding to a selection of an insurance task (step 726) and execute the selected task (step 728). The insurance application may also provide an indication of the selection of the insurance task (step 730), e.g., a selection message. The recommendation engine, for example, may receive the selection message and update the selection trend data store (step 732) based on the insurance task selection indicated in the selection message. For example, the recommendation engine may increment a selection frequency value for the insurance task as well as adjust the relevancy scores for the selected insurance task (step 734). As discussed above, the relevancy scores may be associated with user group-insurance task pairings or user attribute-insurance task pairings. Receipt of the selection message at the recommendation engine may trigger an update the relevancy score for the group-task pairing corresponding to the insurance task selected and the user group the user is associated with. Additionally or alternatively, the recommendation engine may update the relevancy score for each attribute-task pairing corresponding to the insurance task selected and the respective user profile attributes of the user. Updating the relevancy score may include, for example, increasing or decreasing the relevancy score based on whether a user selected an insurance task associated with the relevancy score. As set forth above, the user may, in some circumstances, select an insurance task at the insurance application that was not included in the set of recommended insurance tasks. In these situations, the selection message may additionally or alternatively indicate that the user selected an insurance task that was not included in the set of recommended insurance tasks. The relevancy score for the insurance task selected by the user, in this example, may be similarly increased such that insurance tasks that become relevant to a user may eventually be included in the set of recommended insurance tasks.

Figure 9:
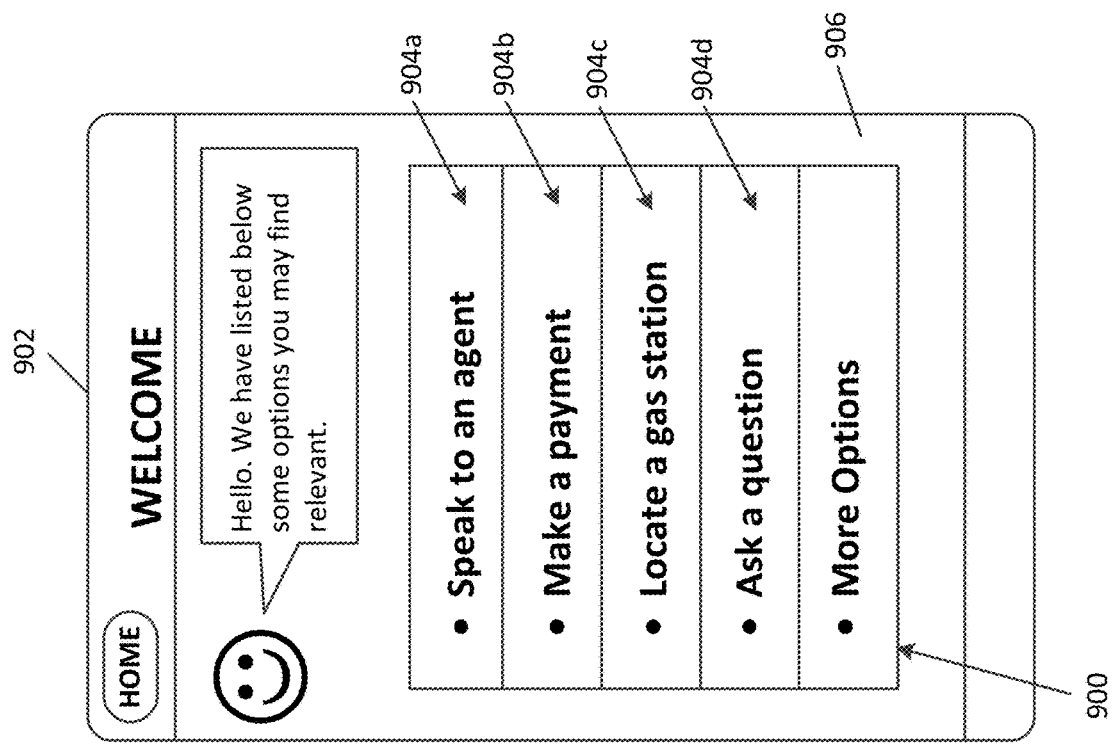
FIG. 9 is another example of an implementation of a user interface display of an insurance application that includes a list of recommended insurance tasks.
Figure 8:
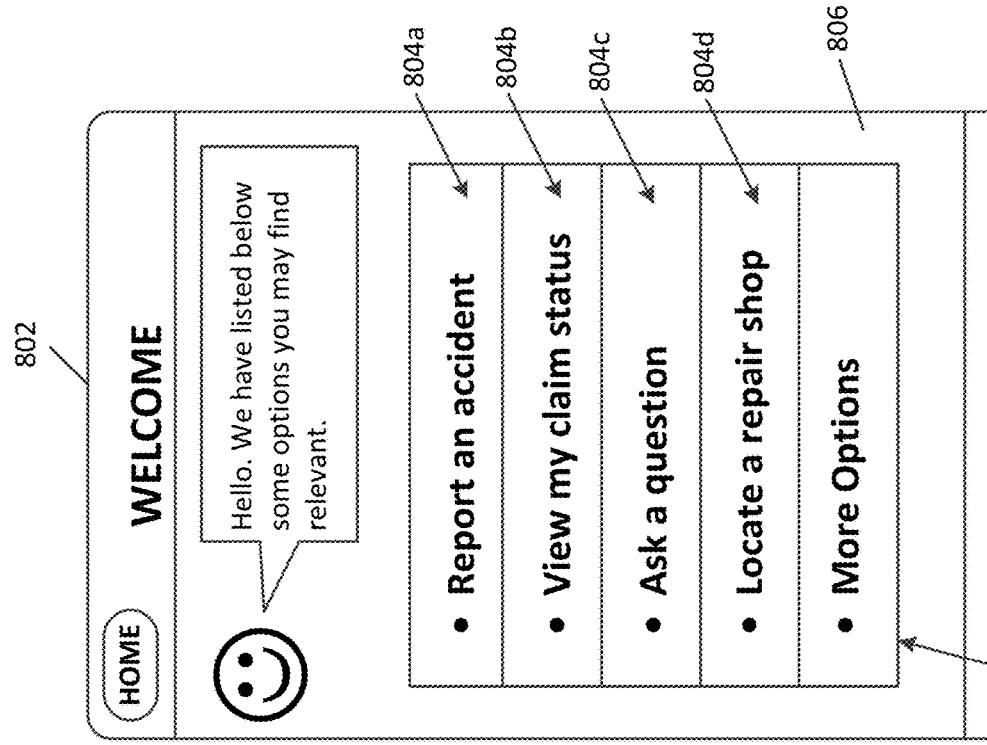
FIG. 8 is an example of an implementation of a user interface display of an insurance application that includes a list of recommended insurance tasks.

Examples of recommended insurance task lists 800 and 900 obtained in accordance with the steps above are shown in FIG. 8 and FIG. 9 respectively. In FIG. 8, the user of the insurance application 802, in this example, is a relatively inexperienced and high-risk driver associated with a user group defined by 16-20 year old males that drive sports cars and have been involved in a number of vehicle accidents. Accordingly, based on the selections of other users associated with the inexperienced and high-risk user group, the recommendation engine may determine that the relevant insurance tasks for this user group include reporting an accident 804*a*, inquiring about a claim status 804*b*, asking an insurance question 804*c*, and locating a repair shop 804*d*. The recommendation engine may include these insurance tasks 804*a*-*d* in the set of recommended insurance tasks used to generate the insurance task list 800 presented at the user interface display 806.

In FIG. 9, the user of the insurance application 902, in this other example, is a relatively experienced and low-risk driver associated with a user group defined by 44-55 year old females with clean driving records that drive vehicles with high safety ratings. The recommendation engine may determine that different insurance tasks are relevant for this experienced and low-risk user group based on the selections of other users associated with this group. For the experienced and low-risk user group, in this example, the recommendation engine may determine that relevant insurance tasks include initiating a request to speak with an insurance agent 904*a*, submitting an insurance payment 904*b*, locating a gas station 904*c*, and asking an insurance related question 904*d*. The recommendation engine may likewise include these insurance tasks 904*a*-*d* in the set of recommended insurance tasks used to generate the insurance task list 900 presented at the user interface display 906.

Figure 11:
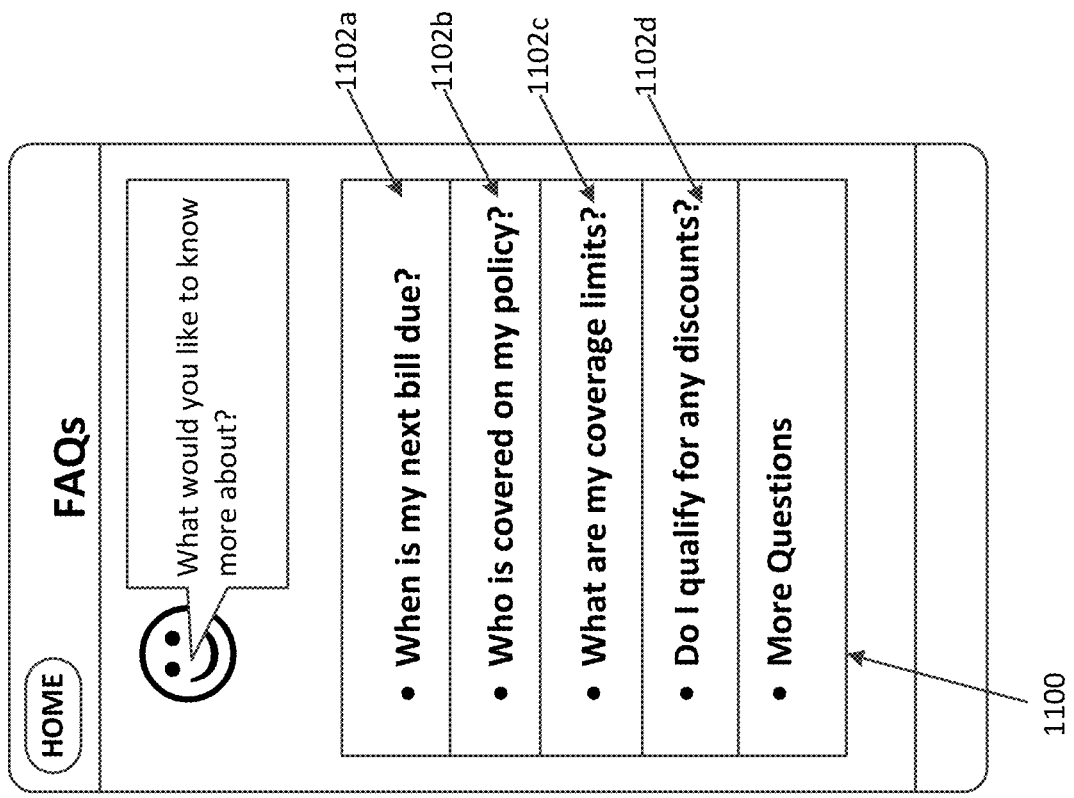
FIG. 11 is another example of an implementation of a user interface display of an insurance application that includes a list of recommended insurance questions.
Figure 10:
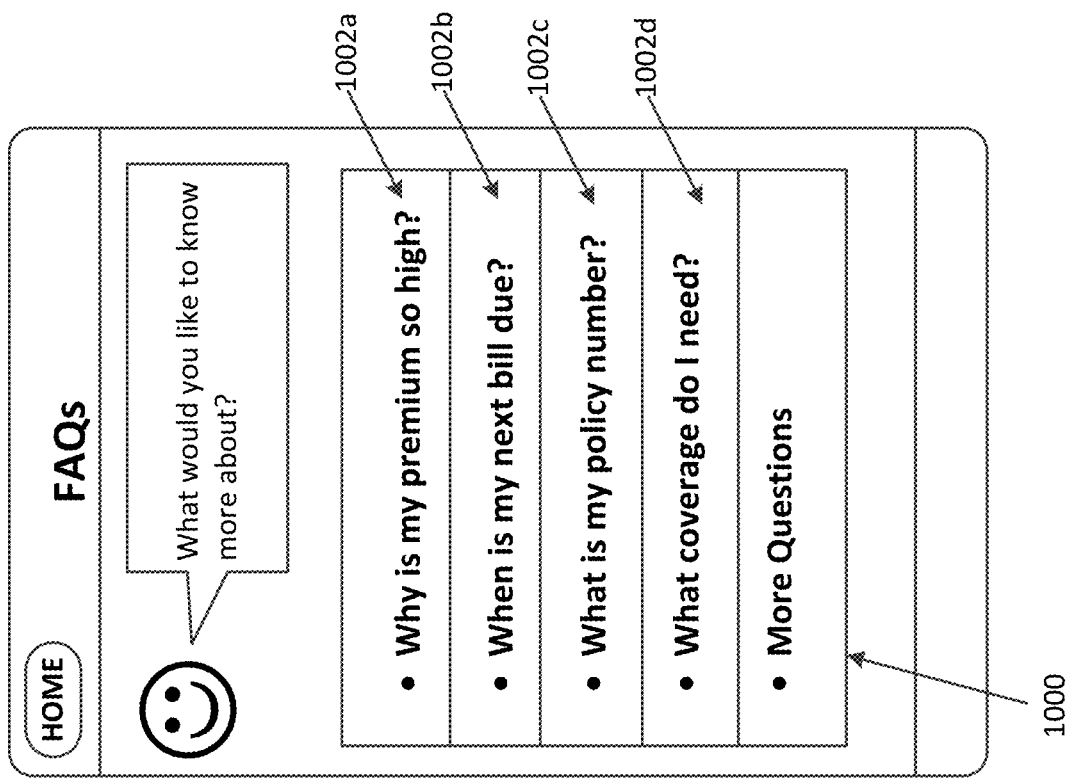
FIG. 10 is an example of an implementation of a user interface display of an insurance application that includes a list of recommended insurance questions.

As mentioned above, the insurance task list may be a list of insurance-related questions, and the recommendation engine may determine which insurance questions are relevant to a user group based on the selection of insurance questions by users of that user group. Examples of recommended insurance question lists 1000 and 1100 obtained in accordance with the steps above are shown in FIG. 10 and FIG. 11. In FIG. 10, the list of recommended insurance questions 1000 is based on the inexperienced and high-risk user group of FIG. 8. As seen in FIG. 10, the list of recommended insurance questions 1000 may include questions relevant to an inexperienced and high-risk driver including questions relating to insurance premiums 1002*a*, upcoming bills 1002*b*, insurance policy information 1002*c*, and general insurance coverage information 1002*d*. In FIG. 11, the list of recommended insurance questions 1100 is based on the experienced and low-risk user group of FIG. 9. Accordingly, the list of recommended insurance questions 1100 in FIG. 11 may include questions relating to upcoming bills 1102*a*, specific insurance coverage information 1102*b* and 1102*c*, and discount information 1102*d*. In this way, the insurance task recommendation system may advantageously predict which insurance tasks, insurance questions, or insurance task options are likely to be relevant to a user, and automatically present those insurance tasks, questions, or options to the user.

Figure 12:
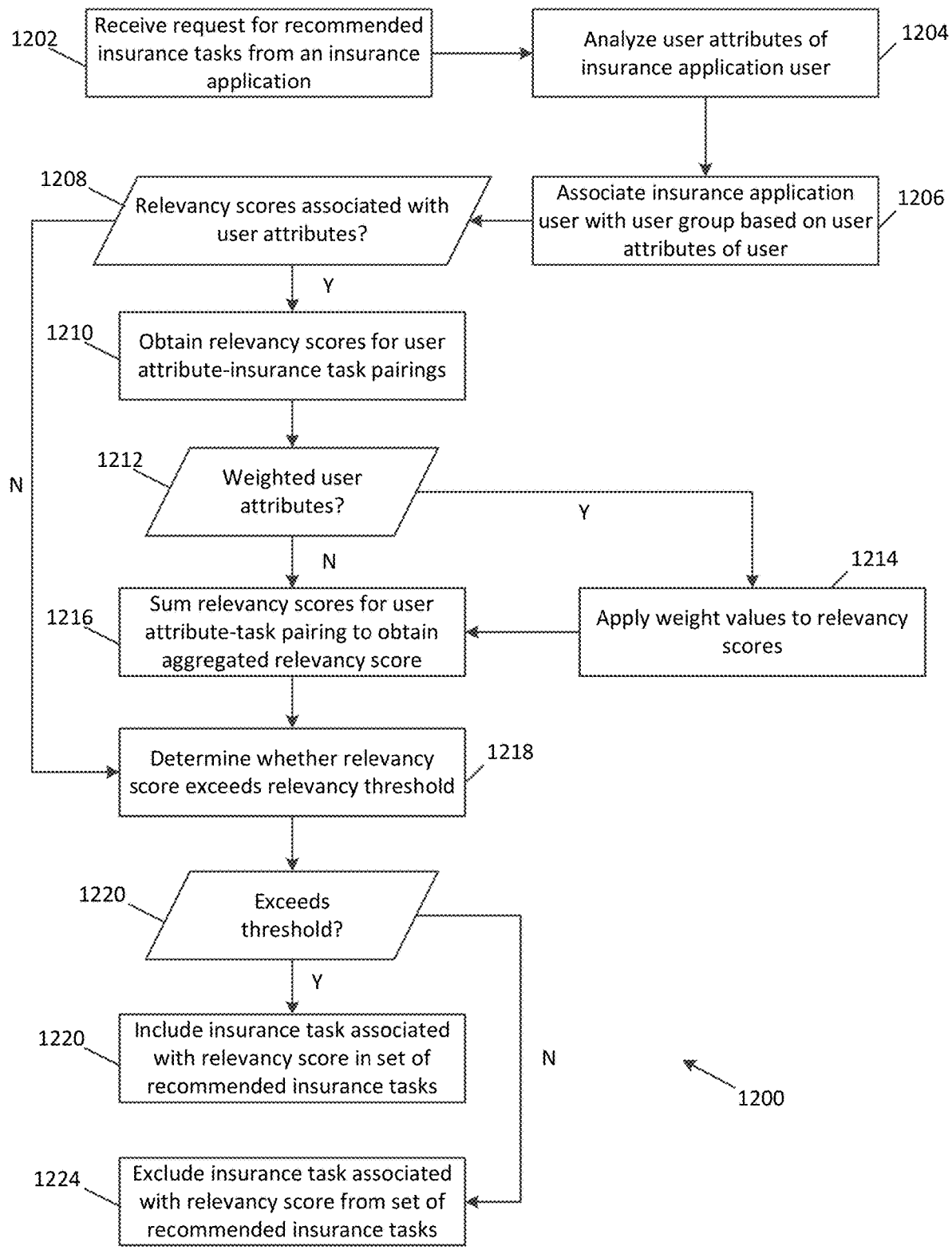
FIG. 12 is a flowchart of example method steps for determining a set of recommended insurance tasks.

Referring now to FIG. 12, a flowchart 1200 of example method steps for determining a set of recommended insurance tasks is shown. A recommendation engine may receive a request for a set of recommended insurance tasks (step 1202), analyze user attributes of a user associated with the request (step 1204), and associate the user with a user group (step 1206). As discussed above, relevancy scores for the insurance tasks may be associated with user groups or with user attributes. If relevancy scores are associated with user attributes (step 1208), then the recommendation engine may obtain the relevancy scores for the attribute-task pairings corresponding to the user attributes of the user (step 1210). If the user attributes are weighted (step 1212), then the recommendation engine may apply the weights associated with the user attributes to the respective relevancy scores of the attribute-task pairings (step 1214). The recommendation engine may then sum the relevancy scores (weighted or not weighted) in order to obtain an aggregated relevancy score for an attribute-task pairing (step 1216). Steps 1210-1216 may be repeated for each attribute-task pairing.

The recommendation engine may then determine whether respective relevancy scores for the group-task pairings or the respective aggregated relevancy scores for the attribute-task pairings exceed a relevancy threshold (step 1218). If the relevancy score exceed the relevancy threshold (step 1220), then the recommendation engine may include the insurance task in the set of recommended insurance tasks (step 1222). If the relevancy score does not exceed the relevancy threshold (step 1220), then the recommendation may not include the insurance task in the set of recommended insurance tasks (step 1224). Steps 1218-1224 may be repeated for each group-task pairing or each attribute-task pairing. It will be appreciated that these example method steps may be similarly employed to generate a set of recommended insurance questions as well as a set of recommended insurance task options for respective presentation in a list of insurance question or a list of insurance task options.

Figure 13:
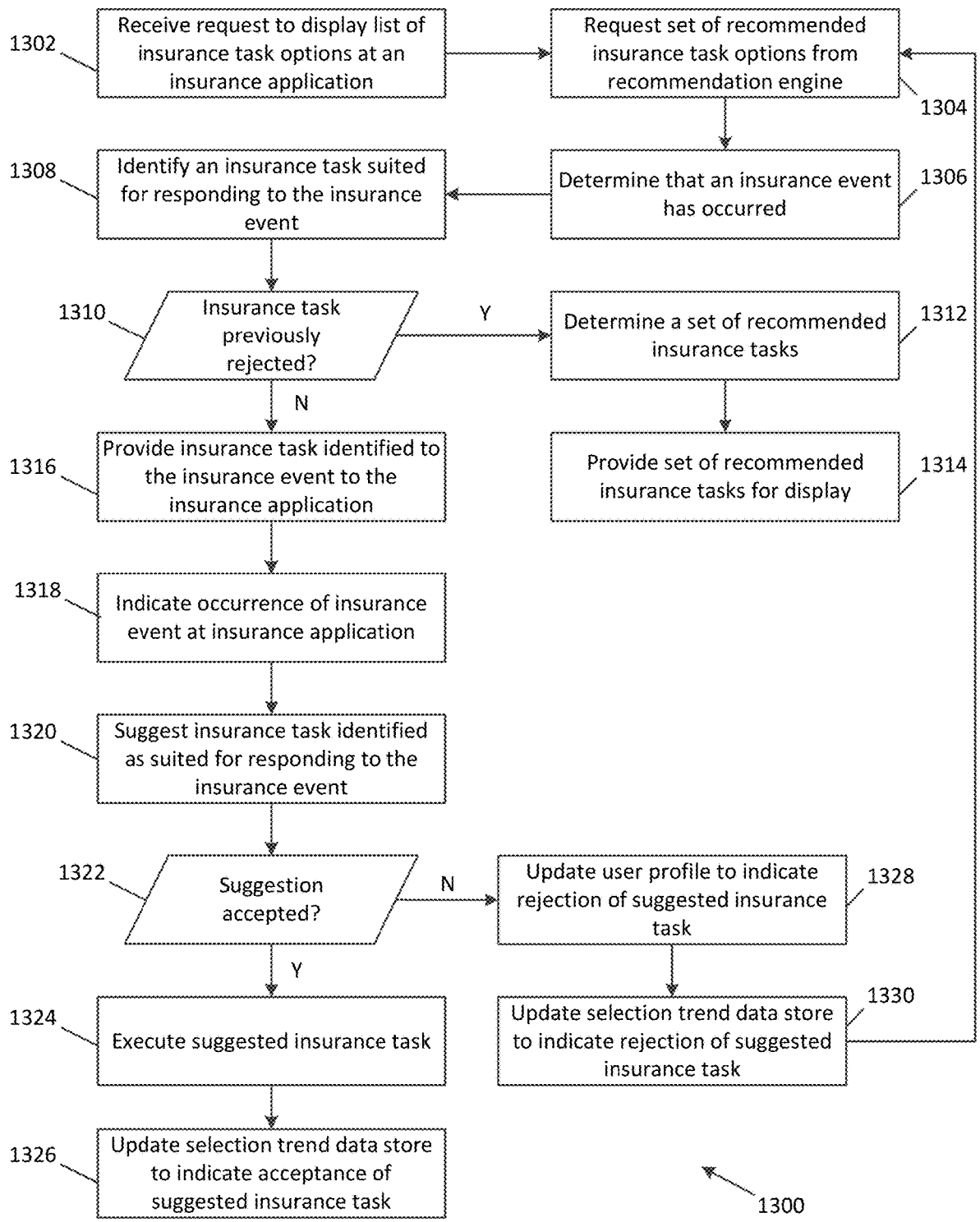
FIG. 13 is a flowchart of example method steps for suggesting an insurance task in response to the occurrence of an insurance event.

As noted above, some example embodiments of the insurance task recommendation system may suggest a particular insurance task to a user in response to a determination that an insurance incident has occurred. Referring to FIG. 13, a flowchart 1300 of example method steps for suggesting a particular insurance event to a user is shown. The insurance application may receive a request from the user to display the list of insurance task options (step 1302), e.g., by launching, activating, or otherwise operating the insurance application. The display manager of the insurance application may request a set of recommended insurance tasks from the recommendation engine (step 1304). In some example embodiments, the insurance task recommendation system may push recommended insurance task options to the insurance application automatically, e.g., in response to a detection of an insurance event at the insurance task recommendation system.

The recommendation engine may determine that an insurance event has occurred (step 1306). An insurance event may be any insurance-related occurrence and include, for example, a start of a new insurance premium payment period, a filing of an insurance claim associated with the user, an update to an existing insurance claim associated with the user, a determination of asset loss, and so forth. In response to a determination that an insurance event has occurred, the recommendation engine may identify an insurance task that is suited for responding to the insurance event (step 1308). The data store of the insurance task recommendation system may store and retain information indicating the occurrence of insurance events for the user. Accordingly, the recommendation engine may query the data store for information regarding any insurance events that have occurred with the respect to the user. As an example, an insurance event may include an increase to an insurance premium for the insurance policy of the user. The recommendation system may determine that an insurance premium increase has occurred, and determine that a user might want to know why the insurance premium has increased. In this example, the recommendation engine may suggest an insurance question directed towards insurance premium increases. Insurance events may also include life events for which individuals may wish to review or update their insurance policies. As an example, the insurance task recommendation system may determine that a customer has a child that recently turned eighteen years old, e.g., based on profile information stored for the customer. The insurance task recommendation system may thus suggest that the individual add the child to an insurance policy. As another example, the insurance task recommendation system may determine that a new child was recently born to a customer and thus suggest that the customer add the child to a life insurance policy of the customer. As a further example, the insurance task recommendation system may determine that a customer recently purchased new furniture and suggest that the customer review the coverage provided by a homeowners insurance policy of the customer. It will be appreciated with the benefit of this disclosure that that insurance task recommendation system may be configured to identify additional or alternative life events and in order to recommend insurance-related tasks.

The insurance application may be configured to prompt acceptance or rejection of the suggested insurance task. Accordingly, the recommendation engine may be configured to avoid suggesting insurance tasks a user has previously rejected. If the user has previously rejected the suggested insurance task (step 1310), then the recommendation engine may determine a recommended set of insurance tasks as normal (step 1312) and provide the set of recommended insurance tasks for display despite the occurrence of the insurance event (step 1314).

If the user has not previously rejected the suggested insurance task (step 1310), then the recommendation engine may provide the suggested insurance task, e.g., to the display manager, for presentation to the user (step 1316). The insurance application may provide notification that an insurance event has occurred (step 1318) and present the insurance task to the user as a suggested insurance task based on the occurrence of the insurance event (step 1320). The insurance application may be configured to prompt the user to accept or reject the suggested insurance task. If the user accepts the suggestion (step 1322), then the insurance application may execute the suggested insurance task (step 1324). The insurance application may also initiate an update to the selection trend data store to indicate that the user accepted the suggestion (step 1326). If the user does not accept the suggestion (step 1322), then the insurance application may initiate an update to the user profile of the user in order to indicate that the user rejected the suggestion (step 1328). In this way, the recommendation engine may avoid recommending the insurance task again for the same insurance event or, additionally or alternatively, insurance events of the same type. For example, if the user rejects the suggestion to pay a bill once (or multiple times), then the recommendation engine may not suggest the bill payment task for subsequent bill payment periods. The insurance application may also initiate an update to the selection trend data store to indicate that the user rejected the suggestion (step 1330). Upon rejection of the insurance task suggestion, a set of recommended insurance tasks may be requested (step 1304).

Figure 15:
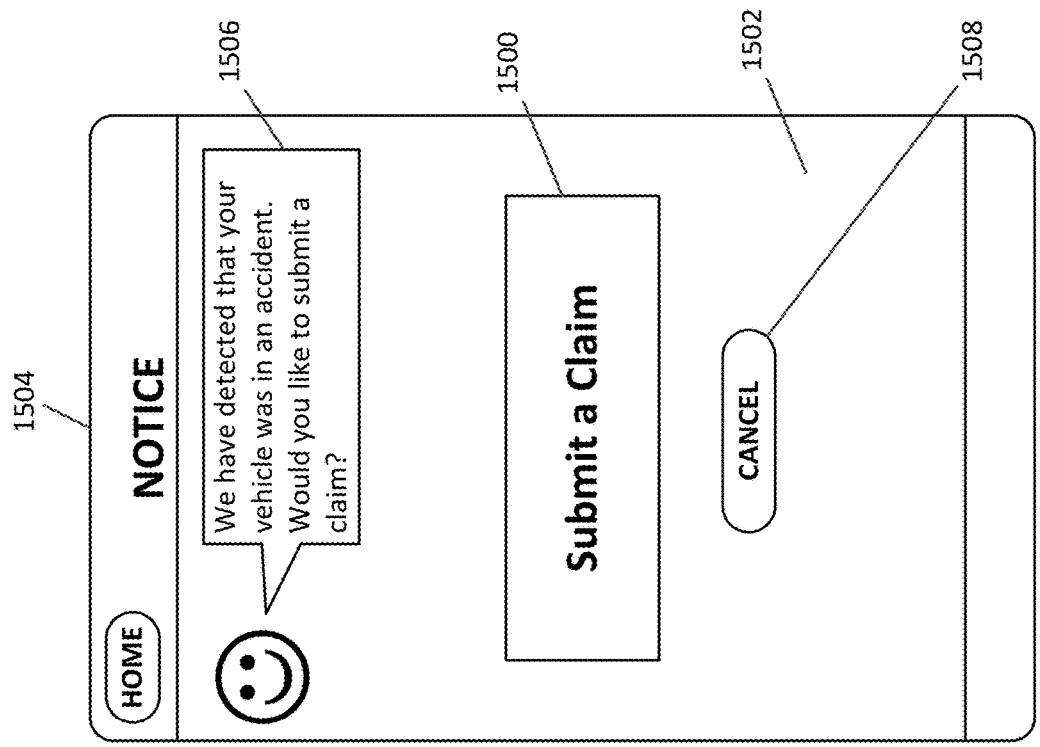
FIG. 15 is another example of an implementation of a user interface display of an insurance application that includes a suggested insurance task.
Figure 14:
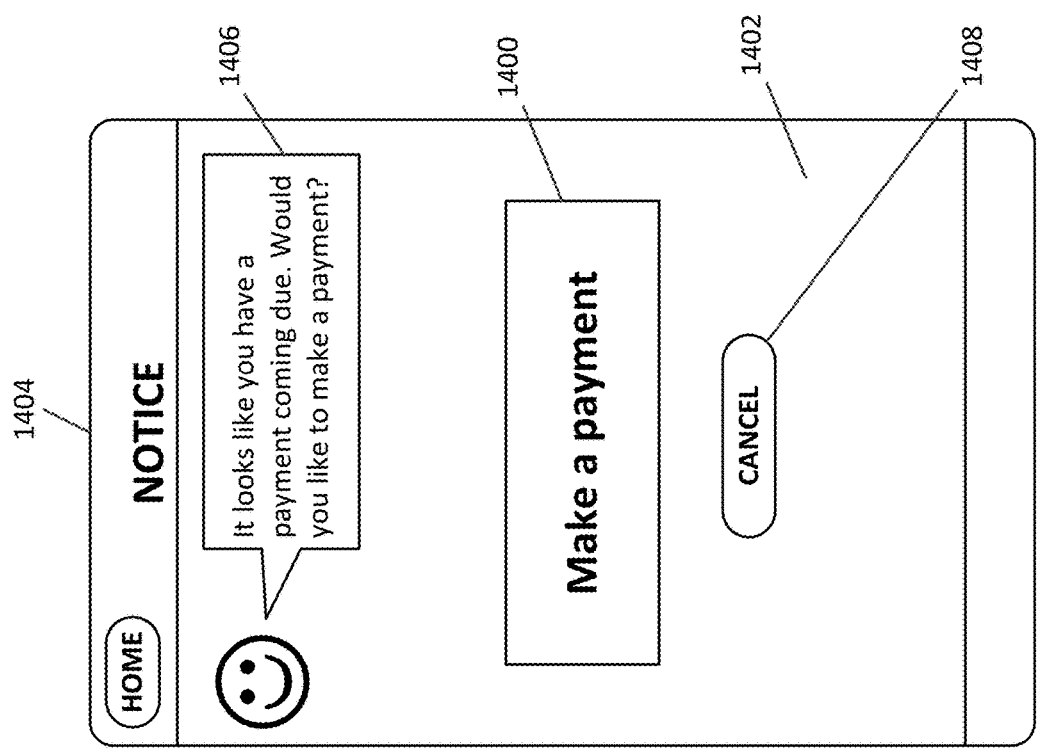
FIG. 14 is an example of an implementation of a user interface display of an insurance application that includes a suggested insurance task.

In accordance with the steps set forth above in FIG. 13, examples of insurance tasks suggestions 1400 and 1500 are shown by way of example in FIGS. 14 and 15. In FIG. 14, the user interface display 1402 of the insurance application 1404 includes an indication 1406 that an insurance event has occurred, in particular, the beginning of a payment period for an insurance premium. The recommendation engine may have determined that the insurance task for submitting an insurance premium payment is suited to respond to the occurrence of this insurance event. Accordingly, the recommendation engine may suggest the insurance premium payment task 1400 to the display manager of the insurance application 1404, and the display manager may present the insurance premium payment task at the user interface display 1402. The display manager may also include a user interface element 1408 to reject (e.g., cancel) the suggestion.

In FIG. 15, the user interface display 1502 of the insurance application 1504 includes an indication 1506 that an insurance event has occurred, in this example, the detection of an accident involving a vehicle associated with the user. Accordingly, the recommendation engine may determine that the insurance task for submitting an insurance claim is suited to respond to this insurance event. The recommendation engine may thus suggest the insurance claim submission task 1500 to the display manager of the insurance application 1504. In response to receipt of the suggested insurance task, the display manager may present the insurance claim submission task 1500 at the user interface display 1502 along with a user interface element 1508 for rejecting the suggestion.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, aspects of the described implementation include software but aspects of the present disclosure may be implemented as a combination of hardware and software or in hardware alone. Additionally, although aspects of the present disclosure are described as being stored in memory, one skilled in the art will appreciate that these aspects can also be stored on other types of non-transitory computer-readable storage media, such as secondary storage devices, like hard disks, floppy disks, or CD-ROM or other forms of RAM or ROM.

What is claimed is:
1. A computer-implemented method of configuring an application residing at a computing device comprising:
receiving, at a computing device from each of a plurality of first applications, a message indicating a task selected from the plurality of first applications and one of at least one first user that selected the task;
storing, at a data store of the computing device, selection data that indicates the task selected and the one of the at least one first user;

receiving, at the computing device from a second application, a request for a recommended task, wherein the request indicates a second user;

identifying, by the computing device based on the selection data, a plurality of tasks selected by the at least one first user having a user attribute in common with the second user, wherein each task in the plurality of tasks indicates a class of insurance product and wherein the user attribute comprises geographic location information of a user and an indication of an insurance policy and the plurality of tasks comprises a subset of the tasks selected from the plurality of first applications and the second application provides options for performing the plurality of tasks;

obtaining, by the computing device, a relevancy score for each of the plurality of tasks selected by the at least one first user having the user attribute in common with the second user by:

obtaining, for each of a plurality of second user attributes of the second user, a score for at least one task of the plurality of tasks, the score calculated based on the user attribute; and aggregating each score obtained for each of the plurality of second user attributes to calculate the relevancy score for each of the plurality of tasks;

selecting, by the computing device, one of the identified tasks as the recommended task based on the relevancy score obtained for each of the plurality of tasks, wherein the recommended task comprises a set of actions performed based on input obtained via user input elements displayed via the second application and the class of insurance product indicated by the recommended task corresponds to the insurance policy; and providing, by the computing device to the second application, a response that indicates the recommended task, wherein receipt of the response at the second application causes the second application to include the recommended task in a task list displayed by the second application.

2. The computer-implemented method of claim 1, further comprising:

identifying a user group that the at least one first user and the second user belong to based on the user attribute in common; and obtaining a relevancy score for each of a plurality of tasks selected by one or more users of the user group;

wherein the selecting the one of the identified tasks as the recommended task comprises selecting the recommended task based on each relevancy score obtained for each of the plurality of tasks selected by the one or more users of the user group.

3. The computer-implemented method of claim 2, wherein:

the relevancy score obtained for each of the plurality of tasks selected by the one or more users of the user group is based on (i) a number of times a task has been selected by one or more users of the user group, and (ii) a number of times a task has been displayed to one or more users of the user group.

4. The computer-implemented method of claim 2, wherein:

identifying the user group comprises defining the user group based on at least one user attribute of the second user.

5. The computer-implemented method of claim 1, further comprising:

obtaining, for each user attribute of a plurality of user attributes of the second user, a relevancy score for each of a plurality of tasks selected by one or more users having the user attribute of the plurality of user attributes in common with the second user;

wherein the selecting one of the identified tasks as the recommended task comprises selecting the recommended task based on the relevancy score for each of the plurality of tasks obtained for each user attribute of the plurality of user attributes.

6. The computer-implemented method of claim 1, wherein:

each of the plurality of first applications is a first mobile application; and the second application is a mobile application.

7. The computer-implemented method of claim 1, further comprising weighting the relevancy score for each of the plurality of tasks based on each of the plurality of second user attributes.

8. The computer-implemented method of claim 1, further comprising:

configuring the task list to change the prominence of one or more tasks in the task list.

9. A computer-implemented method of operating an application residing at a computing device comprising:

receiving, at a first computing device from a first user, input requesting display of a task list residing at the first computing device, wherein the task list comprises a plurality of tasks and each task in the plurality of tasks indicates a class of insurance product;

submitting, by the first computing device to a second computing device, a request for a recommended task, wherein the request indicates the first user;

receiving, at the first computing device from the second computing device, a response that indicates the recommended task, wherein the recommended task was previously selected by at least one second user based on a task score obtained for each of the plurality of tasks, the at least one second user having at least one user attribute in common with the first user, the plurality of tasks selected by the least one second user, the application providing options for performing the plurality of tasks, wherein the at least one user attribute comprises geographic location information of a user and an indication of an insurance policy and the task score obtained for each of the plurality of tasks is computed by:

obtaining, for each user attribute of a plurality of user attributes of the first user, a score for one of the tasks of the plurality of tasks, the score calculated based on the at least one user attribute;

aggregating each score obtained for the plurality of user attributes to calculate the task score for each of the plurality of tasks; and selecting one of the plurality of tasks having the highest task score of the task scores obtained for the plurality of tasks as the recommended task, wherein the recommended task comprises a set of actions performed based on input obtained via user input elements displayed using the application and the class of insurance product indicated by the recommended task corresponds to the insurance policy;

configuring the task list to include the recommended task; and displaying, by the application, the task list that includes the recommended task.

10. The computer-implemented method of claim 9, wherein:
- the first computing device is a mobile computing device; and
- the application is a mobile application.

11. The computer-implemented method of claim 9, further comprising:
- receiving, at the first computing device from the first user, second input selecting a task included in the task list; and
- providing, by the first computing device to the second computing device, a message indicating the task selected by the second input.

12. The computer-implemented method of claim 11, further comprising:
- configuring, by the first computing device, the message to indicate whether the recommended task was the task selected by the second input.

13. The computer-implemented method of claim 9, further comprising:
- displaying, by the application, a prompt to accept or reject the recommended task; and
- providing, by the first computing device to the second computing device, a message indicating whether the first user accepted or rejected the recommended task.

14. The computer-implemented method of claim 9, further comprising:
- arranging an order of the plurality of tasks of the task list based on a relevancy score obtained for each task of the plurality of tasks;
- wherein the relevancy score obtained for each task of the plurality of tasks is based on a total number of users that previously selected the task for which the relevancy score is obtained and have a user attribute in common with the first user.

15. A computer-implemented method of configuring an application residing at a computing device comprising:
- receiving, at a computing device from each of a plurality of first applications, a first message that indicates a task selected from the plurality of first applications and one of at least one first user that selected the task;
- storing, at a data store of the computing device, selection data that indicates the selected task and the one of the at least one first user;
- identifying, by the computing device, a second user operating a second application;
- identifying, by the computing device based on the selection data, one or more tasks selected by at least one first user having a user attribute in common with the second user, wherein each task of the one or more tasks indicates a class of insurance product and wherein the user attribute comprises geographic location information of a user and an indication of an insurance policy and the one or more tasks comprise a subset of the tasks selected from the plurality of first applications and the second application provides options for performing the one or more tasks;
- obtaining, by the computing device, a relevancy score for each of the one or more tasks selected by the at least one first user having the user attribute in common with the second user by:
  - obtaining, for each of a plurality of second user attributes of the second user, a score for one of the one or more tasks, the score calculated based on the user attribute; and
  - aggregating each score obtained for each of the plurality of second user attributes to calculate the relevancy score for each of the one or more tasks; and
- providing, by the computing device to the second application, a second message that indicates one of the identified tasks as a recommended task based on the relevancy score for each of the one or more tasks, wherein the second message causes the second application to include the recommended task indicated in the second message in a task list displayed by the second application and the recommended task comprises a set of actions performed based on input obtained via user input elements displayed using the second application and the class of insurance product indicated by the recommended task corresponds to the insurance policy.

16. The computer-implemented method of claim 15, further comprising:
- identifying a user group that the at least one first user and the second user belong to based on the user attribute in common; and
- obtaining a relevancy score for each of a plurality of tasks selected by one or more users of the user group;
- wherein the indicating the one of the identified tasks as the recommended task comprises selecting the recommended task based on each relevancy score obtained for each of the plurality of tasks selected by the one or more users of the user group.

17. The computer-implemented method of claim 16, wherein:
- the relevancy score obtained for each of the plurality of tasks selected by the one or more users of the user group is based on (i) a number of times a task has been selected by one or more users of the user group, and (ii) a number of times a task has been displayed to one or more users of the user group.

18. The computer-implemented method of claim 16, wherein:
- identifying the user group comprises defining the user group based on at least one user attribute of the second user.

* * * * *